United States Patent
Furuya et al.

(12) 
(10) Patent No.: US 6,265,044 B1
(45) Date of Patent: Jul. 24, 2001

(54) METHOD OF COVERING A PROFILED SURFACE OF A BASE MEMBER WITH A SHEET BY USING BONDING UNDER VACUUM, AND A SHEET SUITABLE FOR USE IN THE METHOD

(75) Inventors: Tamio Furuya; Kenichi Chujo; Junichi Saita; Akihiro Kameshima, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/243,327

(22) Filed: Feb. 3, 1999

(30) Foreign Application Priority Data

| Feb. 5, 1998 | (JP) | 10-024381 |
| Feb. 9, 1998 | (JP) | 10-027375 |
| Feb. 26, 1998 | (JP) | 10-045830 |
| May 18, 1998 | (JP) | 10-135752 |

(51) Int. Cl.$^7$ .................................................... B32B 3/00
(52) U.S. Cl. ................ 428/69; 428/54; 428/68; 428/70; 428/71; 428/76; 428/77; 428/96; 428/142; 428/147; 428/158; 428/159; 428/167; 428/168; 428/304.4
(58) Field of Search .................. 428/54, 68, 69, 428/70, 71, 76, 77, 96, 142, 147, 158, 159, 167, 168, 304.4

(56) References Cited

FOREIGN PATENT DOCUMENTS

784503 * 10/1957 (GB) .

OTHER PUBLICATIONS

Apr. 26, 1999, Search Report form UK Patent Office for application No. GB 9902545.4.

* cited by examiner

*Primary Examiner*—Yogendra Gupta
*Assistant Examiner*—Charles Boyer
(74) *Attorney, Agent, or Firm*—Merchant & Gould P.C.

(57) ABSTRACT

A vacuum covering method for covering a profiled surface of a base member with a sheet by effecting bonding between the sheet and the base member under vacuum, wherein the base member has a multiplicity of spaced vacuum grooves extending across the profiled surface. When air is evacuated from the vacuum grooves, the sheet is drawn by vacuum or suction down onto the profiled surface. The base member is injection-molded of synthetic resin and undergoes thermal shrinkage when it becomes cool after molding. With the vacuum grooves provided in the profiled surface, thermal shrinkage is distributed uniformly over the entire area of the profiled surface and does not generate shrink mark which may form a depression on a front surface of the sheet bonded to the base member.

6 Claims, 19 Drawing Sheets

D1 = D2
L1 < L2
t1 > t2

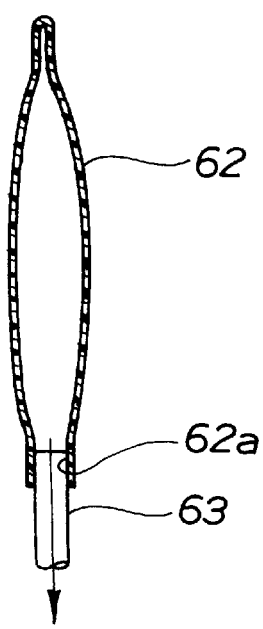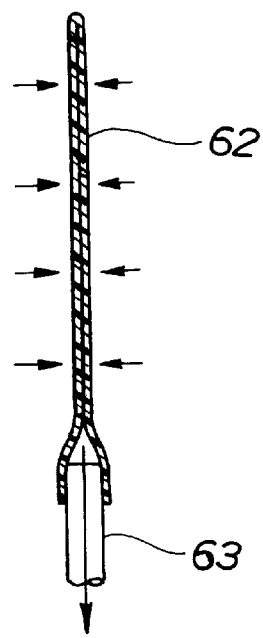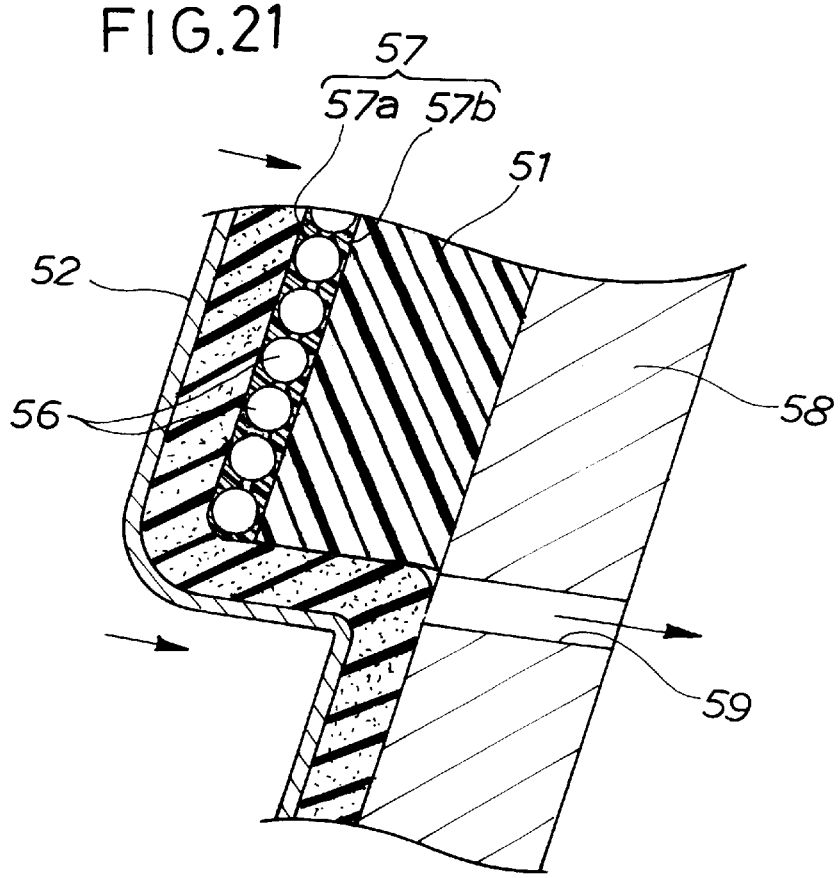

METHOD OF COVERING A PROFILED SURFACE OF A BASE MEMBER WITH A SHEET BY USING BONDING UNDER VACUUM, AND A SHEET SUITABLE FOR USE IN THE METHOD

BACKGROUND OF THE INVENTION

1. Field of the Invention

The present invention relates to a vacuum covering method in which a sheet is drawn by vacuum or suction down onto a profiled surface of a base member to effect bonding therebetween to cover the profiled surface with the sheet. It also relates to a sheet particularly suitable for use in the vacuum covering method.

2. Description of the Related

FIG. 29 shows in cross section a portion of a vehicle instrument panel which exemplifies an article produced in accordance with a conventional vacuum covering method. The article (instrument panel) has a sheet bonded by adhesion to a profiled surface of a base member through the vacuum process.

Conventionally, the instrument panel is produced as follows.

At first, a base member 101 injection-molded from synthetic resin and a sheet 102 of double layered structure having a facing layer 103 and a foam layer 104 of polypropylene are provided. Then, the base member 101 is set on the lower mold member (not shown) of a vacuum mold assembly. Subsequently, a primer 105a is coated on a rear surface (foam-layer side) of the sheet 102, and an adhesive 105b is coated on a front surface of the base member 101. After heating the base member 101 and the sheet 102 at desired temperatures, the sheet 102 is placed over the base member 101. In this instance, the sheet is stretched in one direction. Then, an upper mold member is lowered toward the lower mold member to close the vacuum mold assembly with the sheet 102 and base member 101 held therein. While the vacuum mold assembly is kept closed, air is evacuated from vacuum holes 101a in the vacuum mold assembly so that the sheet is drawn by vacuum or suction down onto the base member to thereby effect adhesive bonding between the sheet 102 and the base member 101.

A typical material eligible for the base member 101 is acrylonitrile-butadiene-styrene (hereinafter abbreviated as "ABS") resin. The facing layer 103 of the sheet 102 is made from polyvinyl chloride (hereinafter abbreviated as "PVC"), and the foam layer 104 of the sheet 102 is made from polypropylene (hereinafter abbreviated as "PP").

In general, the base member 101 of ABS resin is produced by injection-molding. The injection-molded base member 101 undergoes thermal shrinkage as it becomes cool. The PP is advantageous over the ABS resin from a recycling point of view. However, the PP is a crystalline polymer and hence has a large rate of shrinkage. Accordingly, in the case of a base member 101 made from PP, it occurs likely that due to thermal shrinkage concentrated on an area surrounding a vacuum hole 101a, an annular shrink mark (also called "sink mark") is formed around the vacuum hole 101. As a result of generation of the shrink mark, an edge portion 101b of the vacuum hole 101a is forced to swell or project outwardly from a surface of the base member 101. Thus, a sheet 102 which is bonded to the surface of the base member 101 including the projecting edge portion 101b necessarily has a projection 102a on its front surface at a position corresponding to the position of the projecting edge portion 101b. The projection 102a thus formed makes the sheet 102 unsightly in the appearance and lowers the product value of the instrument panel.

SUMMARY OF THE INVENTION

It is accordingly an object of the present invention to provide a vacuum covering method which is capable of covering a profiled surface of a base member with a sheet by effecting bonding between the sheet and the base member reliably through the vacuum process without involving generation of a recess or a projection on a facing layer of the sheet.

Another object of the present invention is to provide a sheet which is particularly suitable for use in the vacuum covering method.

According to a first aspect of the present invention, there is provided a method of covering a profiled surface of a base member with a sheet by bonding together the sheet and the base member under vacuum, comprising the steps of: (a) providing a base member having a profiled surface and a sheet of thermoplastic material; (b) setting the base member on an outside surface of a mold member of a vacuum mold assembly with the profiled surface facing outward, the mold member having a plurality of vacuum holes opening at one end to the outside surface of the mold member and connected at the other end to a vacuum source; (c) providing one of the profiled surface of the base member and one surface of the sheet with a portion forming vacuum passages extending across the profiled surface of the base member and said one surface of the sheet; (d) while keeping the sheet in a prestretched condition, placing the sheet over the base member so that the vacuum passages formed by said portion are provided between the profiled surface of the base member and said one surface of the sheet and held in fluid communication with at least one of the vacuum holes in the first vacuum mold member; and (e) activating the vacuum source to evacuate air from the vacuum passages through the vacuum hole in the first mold member so that the sheet is drawn by vacuum down onto the profiled surface to thereby effect bonding between the sheet and the profiled surface.

In one preferred form of the present invention, the step of providing a portion forming vacuum passages comprises providing a plurality of spaced vacuum grooves extending across the profile surface of the base member when the base member is formed by injection molding from a synthetic resin material. Preferably, the parallel spaced vacuum grooves have a pitch set to vary inversely with the elongation of the sheet on the base member. The sheet may have a laminated structure including a facing layer of olefin thermoplastic elastomer, and a cushioning foam layer of polypropylene, wherein the vacuum grooves have a width ranging from 0.3 mm to 0.9 mm and a depth ranging from 0.3 mm to 2.0 mm.

In another preferred form of the invention, the step of providing a portion forming vacuum passages comprises providing small resin particles between the profiled surface of the base member and said one surface of the sheet with a predetermined distribution. Preferably, the resin particles are applied to said one surface of the sheet. The resin particles may be polypropylene particles having an average diameter ranging from 0.1 mm to 0.3 mm.

The sheet may include a facing layer, a cushioning foam layer and a barrier layer laminated in the order named. The barrier layer provides one surface of the sheet to be bonded to the profiled surface of the base member. The barrier layer has a greater modulus of elasticity than the facing layer. It is preferable that the facing layer has a modulus of elasticity ranging from 0.02 to 2.0 kg/cm², and the barrier layer 73 has a modulus of elasticity ranging from 3.0 to 5.0 kg/cm² Preferably, the facing layer is made from olefin thermoplastic elastomer, the foam layer is made polypropylene, and the barrier layer is made from polypropylene.

BRIEF DESCRIPTION OF THE DRAWINGS

FIGS. 15–21 are views showing a sequence of processing steps taken in the second embodiment of the vacuum covering method of the present invention, in which FIGS. 18 and 21 are enlarged views of a portion in a circle shown in FIG. 17, and FIGS. 19 and 20 are views illustrative of the principle of operation of the processing steps shown in FIGS. 18 and 21, respectively;

DETAILED DESCRIPTION OF THE PREFERRED EMBODIMENTS

Figure 1:
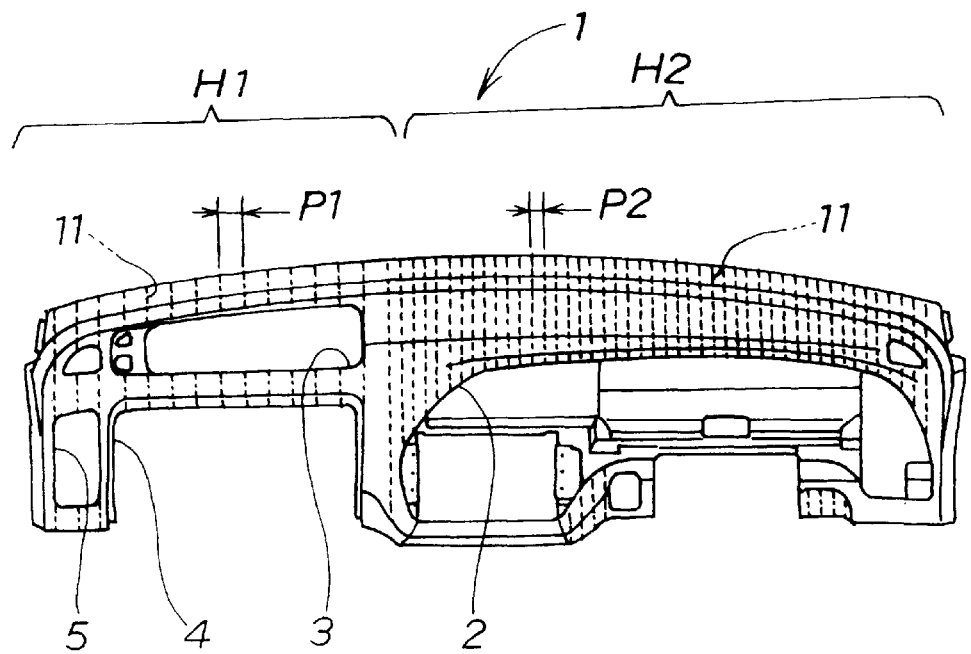
FIG. 1 is a front elevational view of an automotive instrument panel which represents an article produced by a vacuum covering method according to the present invention.

Certain preferred embodiments of the present invention will be described in greater detail with reference to the accompanying sheets of drawings, wherein like or corresponding parts are designated by the same reference characters throughout the several views.

Referring now to FIG. 1, there is shown an instrument panel 1 for motor cars which represents an article produced by a vacuum covering method according to the present invention. As will be described later, the article (instrument panel) 1 has a sheet bonded by adhesion to a base member to cover one surface of the base member.

As is well known, the instrument panel 1 is a panel or board containing indicators, gauges, lights and displays (neither shown) that the driver needs to operate the car. The instrument panel 1 shown in FIG. 1 has a first opening 2 located in front of the driver's seat (right side in FIG. 1) and designed to mount the aforesaid indicators, gauges, lights and displays to the instrument panel 1, a second opening 3 provided on the left side of the first opening 2 for the attachment of a tray (not shown) to the instrument panel 1, a third opening 4 provided below the second opening 3 for the attachment of a glove box to instrument panel 1, and a fourth opening 5 provided at a left end of the instrument panel 1 for mounting a defroster grille.

Figure 2:
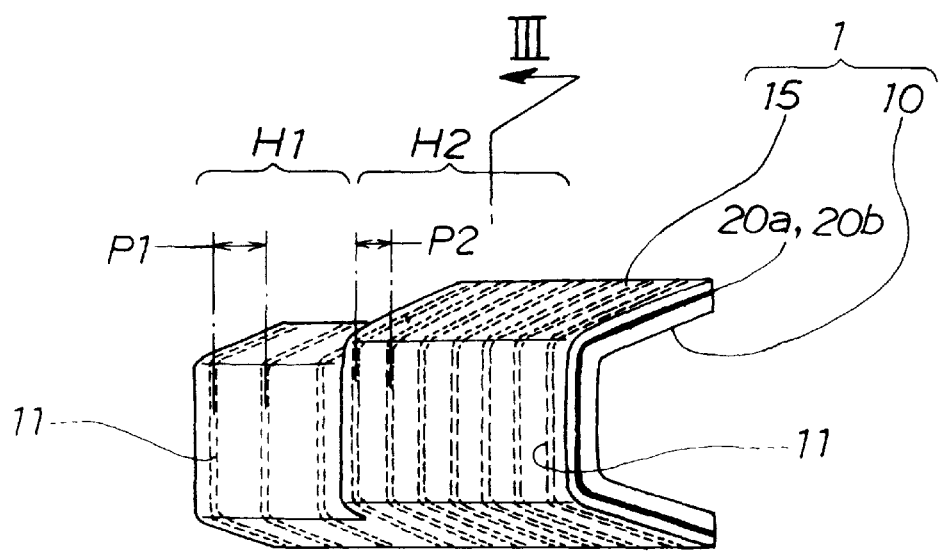
FIG. 2 is a perspective view showing the instrument panel of FIG. 1 in a simplified form for convenience of explanation.

For convenience of explanation, the instrument panel 1 of FIG. 1 is re-illustrated in a simplified form as shown in FIG. 2. The simplified instrument panel 1 has a generally saddle-like form of U-shaped cross section and is composed of a generally channel-shaped base member 10 injection-molded of synthetic resin and a sheet 15 bonded to a front surface (on the convex side) of the base member 10 with a primer (prime coat) 20a and an adhesive layer 20b sandwiched between the sheet 15 and the base member 10.

The base member 10 has a multiplicity of parallel spaced vacuum grooves 11 extending continuously across the front surface to which the sheet 15 is bonded. The vacuum grooves 11 serve as vacuum passages from which air is evacuated or exhausted to draw the sheet 15 by vacuum or suction down onto the front surface of the base member 10, as will be described later.

The base member 10 has a first part H1 (substantially corresponding to a left half of instrument panel 1) within which the pitch P1 of the vacuum grooves 11 is made larger than the pitch P2 of the vacuum grooves 11 within a second part H2 of the base member 10 (substantially corresponding to a right half of the instrument panel 1), for a reason described.

The instrument panel 1 of FIG. 1 (also shown in simplified in FIG. 2) is produced as follows.

Figure 3:
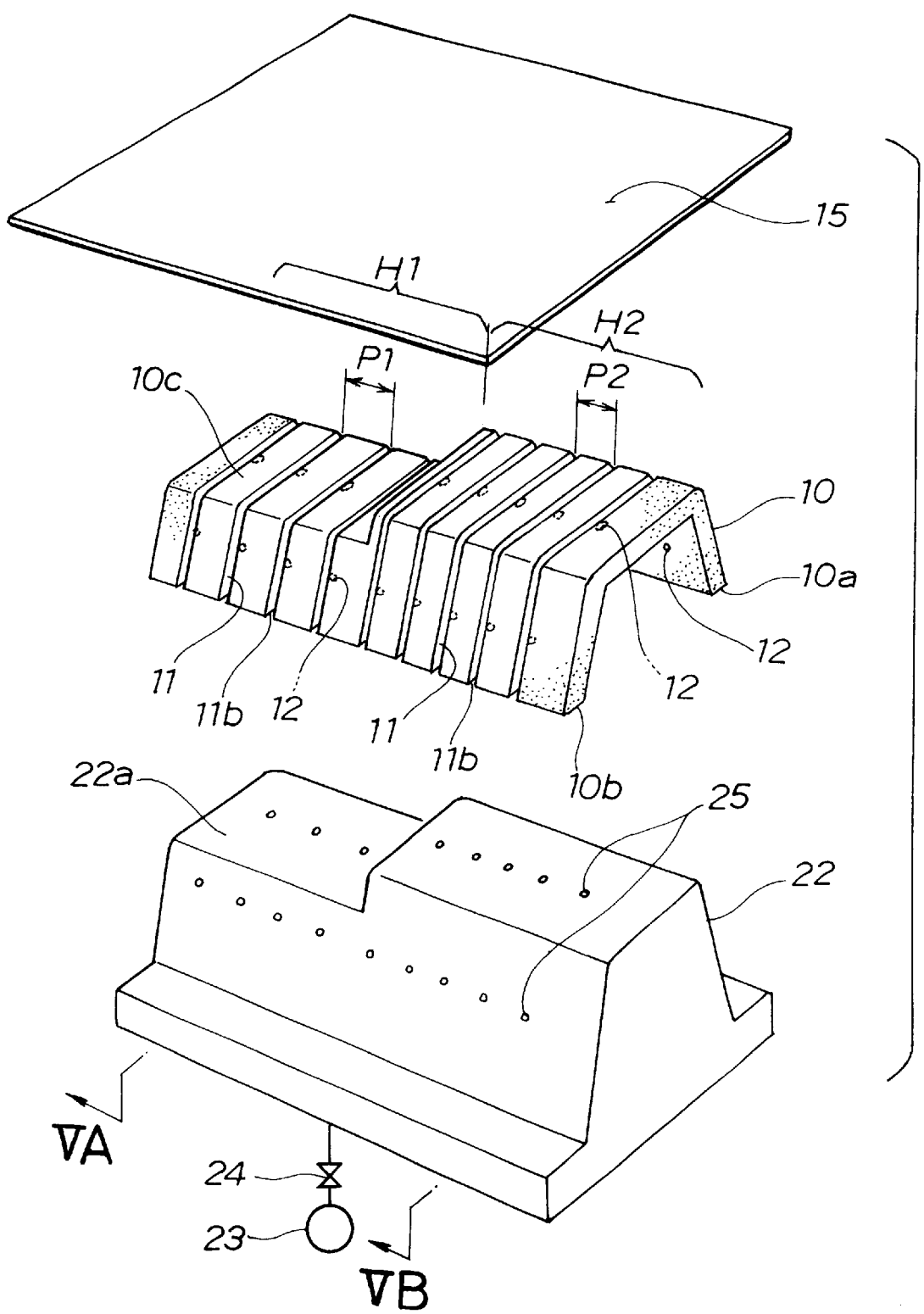
FIG. 3 is a perspective view showing main components used for carrying out the vacuum covering method according to a first embodiment of the present invention.

At first, a base member 10 and a sheet 15 are provided, as shown in FIG. 3.

The base member 10 is made from polypropylene and injection-molded into a stepped saddle-like configuration. At least an outside surface of the base member 10 is profiled to have a design substantially corresponding to the design of a front or obverse surface of the instrument panel 1 (FIGS. 1 and 2). The outside surface will be referred to as "profiled surface". The base member 10 has a plurality of parallel spaced vacuum grooves 11 extending continuously between opposite longitudinal edges 10a, 10b of the base member 10 transversely across the profiled surface 10c, and at least one row (three rows being shown) of vacuum holes 12 extending through the thickness of the base member 10 and arranged longitudinally of the base member 10 such that each vacuum hole 12 is connected to one of the vacuum grooves 11.

Figure 4A:
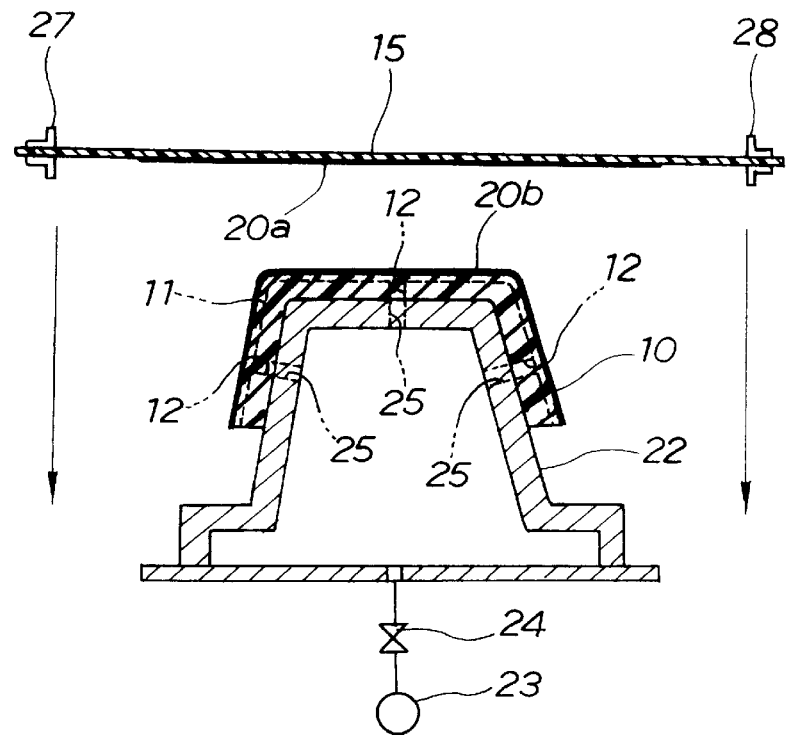
FIGS. 4A and 4B are schematic cross-sectional views showing the manner in which a sheet is drawn down onto a profiled surface of a base member under vacuum to effect adhesive bonding therebetween to form an instrument panel according to the first embodiment of the vacuum covering method of the present invention.

The stepped saddle-like base member 10 injection-molded of polypropylene is set on a lower mold member 22 of a vacuum mold assembly of a vacuum covering apparatus. The lower mold member 22 has an outside surface 22a complementary in contour to the inside surface of the base member 10, and three rows (two being shown) of vacuum holes 25 opening at one end to the outside surface 22a of the lower mold member 22 and connected at the other end to a vacuum source 23, such as a vacuum pump, via a shut-off valve 24. The vacuum holes 25 in each row of vacuum holes 25 correspond in position to the respective ones of a corresponding row of vacuum holes 12 in the base member 10 so that when the base member 10 is set on the outside surface 22a of the lower mold member 12 with the profiled surface 10c facing outward, the vacuum holes 12 in the base member 10 and the vacuum holes 25 in the lower mold member 22 communicate with each other, as shown in FIG. 4A.

Figure 4B:
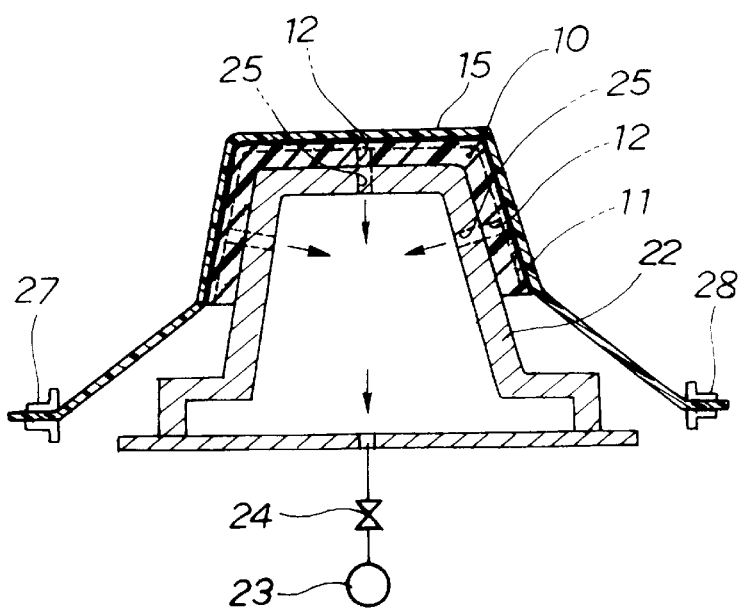

As shown in FIG. 4, one surface of the sheet 15 is coated with a primer (prime coat) 20a, and the sheet 15 is then stretched with its opposite edges gripped by left and right clamps 27, 28 of the vacuum covering apparatus (prestretching of the sheet 15). The sheet 15 while kept in the prestretched condition is heated until it becomes soft. An adhesive 20b is applied to the profiled surface 10c (FIG. 3) of the base member 10 is then heated at a predetermined temperature. Subsequently, the left and right clamps 27, 28 are lowered to place the sheet 15 over the profiled surface 10c of the base member 10 in such a manner as shown in FIG. 4B. In this condition, the vacuum grooves 11 of the base member 10 form vacuum passages defined between the prime-coated surface of the sheet 15 and the adhesive-coated profiled surface 10c of the base member 10. The vacuum passages (vacuum grooves 11) extend in the transverse direction of the base member 10 across the prime-coated surface of the sheet 15 and the adhesive-coated profiled surface 10c of the base member 10.

Then, an upper mold member (not shown but disposed above the lower mold member 22 and the sheet 15) is moved downwards toward the lower mold members 22 to close the vacuum mold assembly with the sheet 15 and the base member 10 held therein. Subsequently, the vacuum source (vacuum pump) 23 is activated and the shut-off valve 24 is open whereupon air is evacuated or exhausted from the vacuum mold assembly through the vacuum holes 25 in the lower mold member 22, the vacuum holes 12 in the base member 10 and the vacuum grooves 11 in the base member 10. With this evacuation, the sheet 15 is drawn by vacuum or suction down onto the profiled surface 10c of the base member 10 to effect firm bonding between the prime-coated surface of the sheet 15 and the profiled surface 10c (FIG. 3) of the base member 10 by means of the adhesive 20b.

The pitches P1 and P2 of the vacuum grooves 11 are determined in consideration of the relationship between the elongation and the thickness of the sheet 15 (i.e., the vacuum grooves 11 have a pitch P1, P2 set to vary inversely with the elongation of the sheet 15 on the base member 10), as described below with reference to FIGS. 5A and 5B.

Figure 5A:
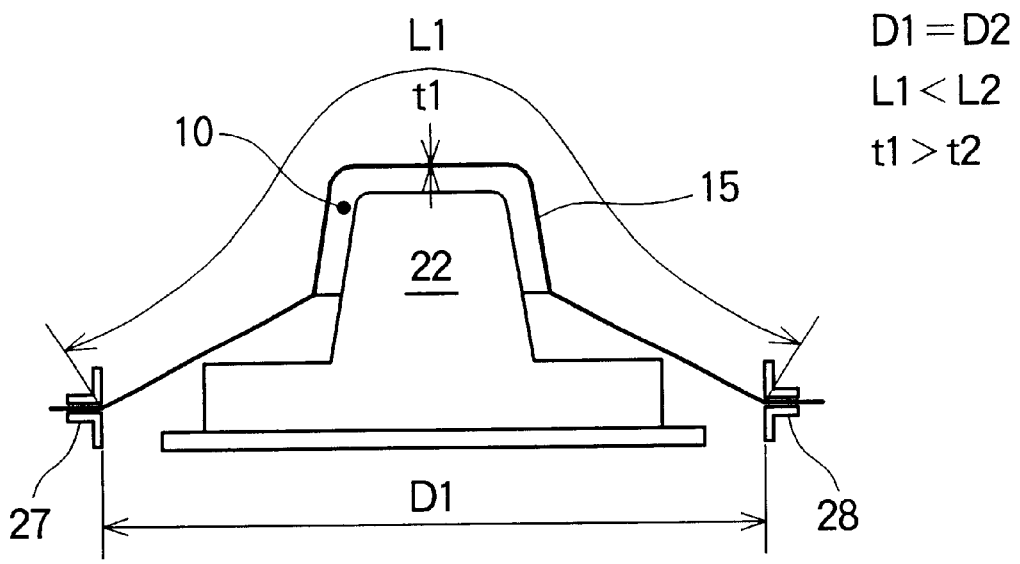
FIGS. 5A and 5B are diagrammatical cross-sectional views taken along lines VA and VB of FIG. 3, respectively, showing the relationship between the elongation and thickness of the sheet.

In FIG. 5A which is a diagrammatical cross-sectional view taken along line indicated by the arrow VA of FIG. 3, the distance between the left and right clamps 27, 28 is denoted by D1, the length of the sheet 15 measured between the clamps 27, 28 after adhesive bonding to the base member 10 is denoted by L1, and the thickness of the sheet 15 measured at the top of the lower mold member 22 after adhesive bonding to the base member 10 is denoted by t1. Similarly, in FIG. 5B which is a diagrammatical cross-sectional view taken along line indicated by the arrow VB of FIG. 3, the distance between the left and right clamps 27, 28 is denoted by D2, the length of the sheet 15 measured between the clamps 27, 28 after adhesive bonding to the base member 10 is denoted by L2, and the thickness of the sheet 15 measured at the top of the lower mold member 22 after adhesive bonding to the base member 10 is denoted by t2.

Figure 5B:
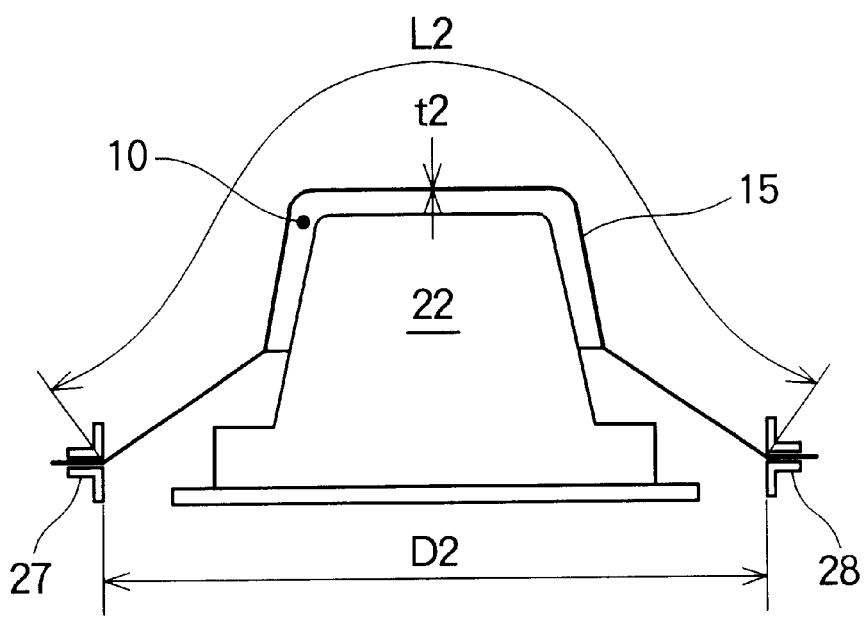

As shown in FIGS. 5A and 5B, D1=D2, and so L1×t1= L2×t2 provided that the width of the sheet(measured in the direction of thickness of the drawing sheet) is constant. Since L1 (FIG. 5A) is smaller than L2 (FIG. 5B), t1 (FIG. 5A) is greater than t2 (FIG. 5B). This means that the thickness of the sheet 15 varies with the largeness or size of projections (convex portions) on the profiled surface of the base member 10.

The flexural rigidity of the sheet 15 varies with the thickness of the sheet 15. In other words, the resistance of the sheet 15 against flexing or deformation increases with an increase in the thickness of the sheet 15. For a portion of the base member 10 which is adapted to be bonded to a thin sheet, the pitch of the vacuum grooves 11 is preferably small enough to prevent the sheet 15 from becoming wrinkled on the base member 10, and the width of the vacuum grooves 11 is also small enough to prevent the sheet 15 from getting into the vacuum grooves 11. By contrast, a thick sheet 15 having a greater deformation resistance than the thin sheet allows the use of vacuum grooves 11 having a greater pitch. Thus, the vacuum grooves 11 have a greater pitch P1 in the first part H1 than in the second part H2 of the base member 10.

Figure 6:
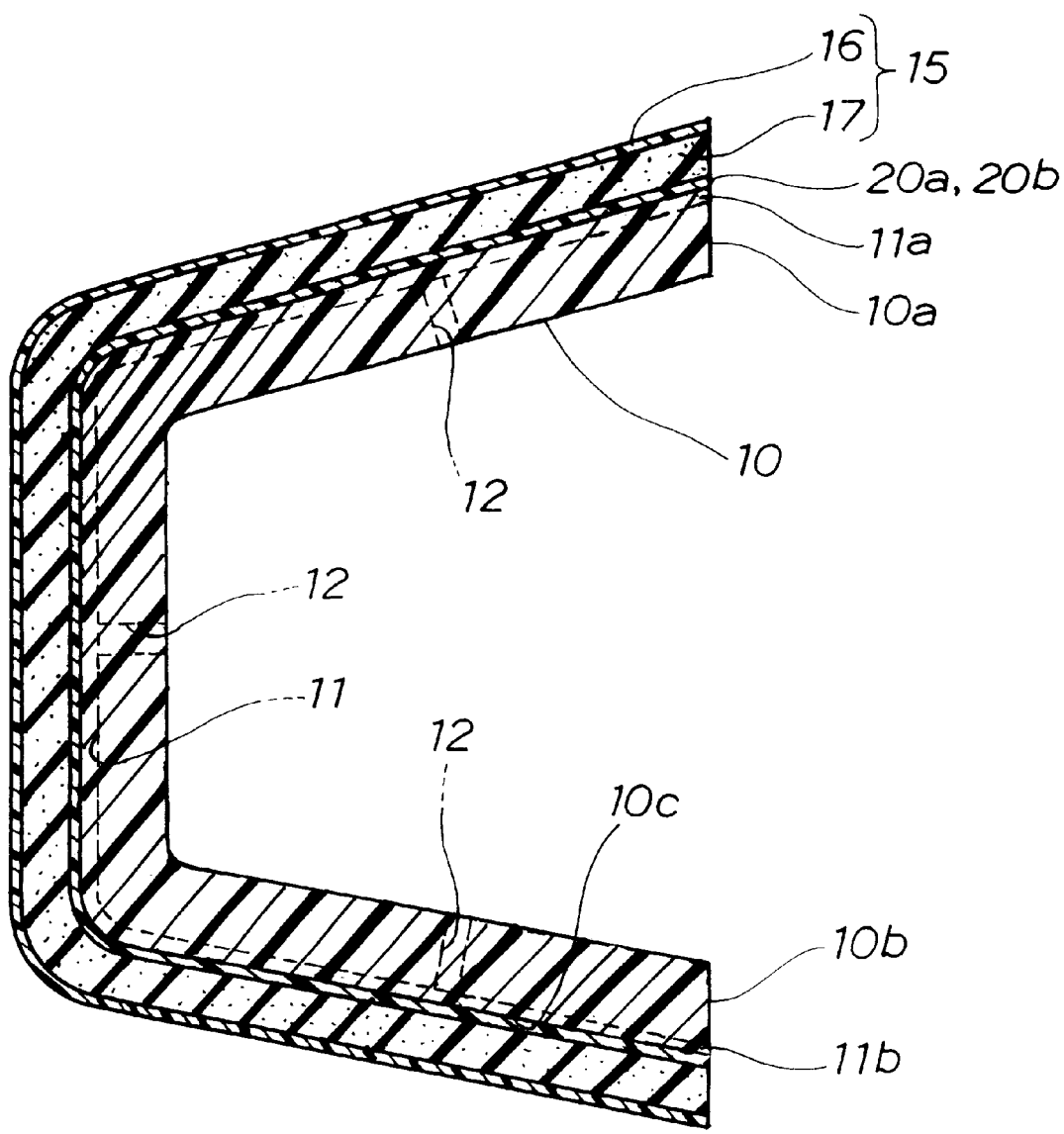
FIG. 6 is an enlarged transverse cross-sectional view of an instrument panel produced by the vacuum covering method shown in FIGS. 3, 4A and 4B, and 5A and 5B.

FIG. 6 illustrates a cross section of the instrument panel formed by the vacuum covering method described above. As shown in this figure, the vacuum grooves 11 (one being shown) extend continuously from one edge 10a (upper edge in FIG. 6) of the base member 10 to the other edge 10b (lower edge in FIG. 6) across the profiled surface 10c. Thus, each of the vacuum grooves 11 is open at opposite ends and communicates with three vacuum holes 12 so that during the evacuating process, air can be evacuated or exhausted from the vacuum groove 11 via the vacuum holes 12.

The sheet 15 has a double-layered structure including a facing layer 16 of polypropylene, and a foam layer 17 of polypropylene. The facing layer 16 and the foam layer 17 are substantially impermeable to air.

Figure 7:
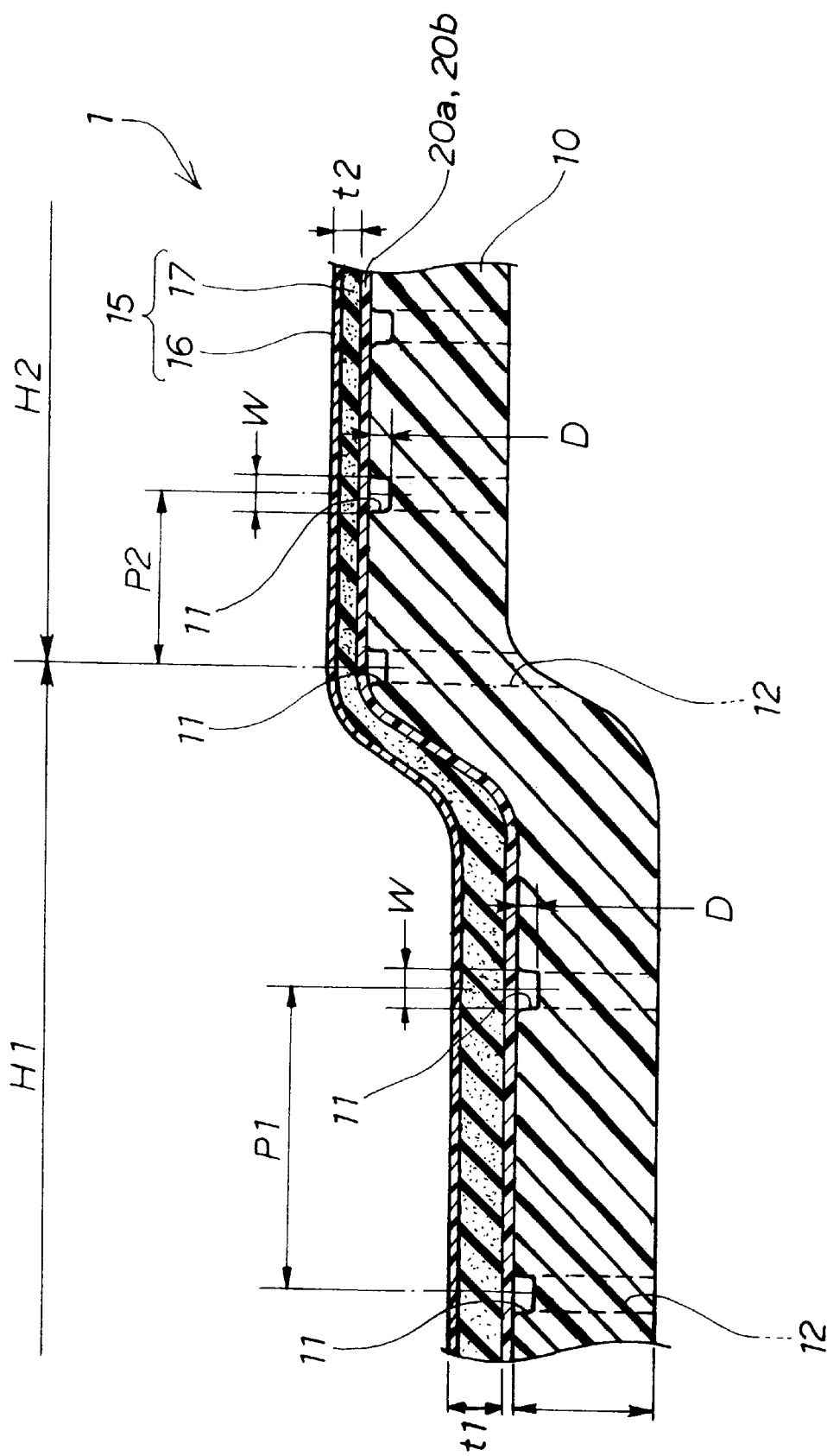
FIG. 7 is a horizontal cross-sectional view of one leg of the instrument panel shown in FIG. 6.

Referring now to FIG. 7, there is shown a horizontal cross section of one leg of the generally U-shaped instrument panel shown in FIG. 6. As shown in this figure, the thickness of the sheet 15 is greater at a first portion corresponding to the first part H1 of the base member 10 than at a second portion corresponding to the second part H1 of the base member 10. This is because the sheet 15 is elongated to a greater extent at the second portion (corresponding to the second part H2 of the base member 10) than at the first portion (corresponding to the first part H1 of the base member 10), as previously described with reference to FIGS. 5A and 5B. The thick first portion of the sheet 15 is relatively rigid than the thin second portion of the sheet 15 and can, therefore, be stably drawn by suction down onto the base member 10 even through the vacuum grooves 11 have a larger pitch P1 in the first part H1 of the base member 10 than in the second part H2 of the base member 10. The thin second portion of the sheet 15 is easy to flex or deform, and so the vacuum grooves 11 in the second part H2 of the base member 10 should preferably have a smaller pitch P2 than in the first part H1 to prevent the sheet 15 from becoming wrinkled or getting in the vacuum grooves 11.

Materials and dimensions of the base member 10 and sheet 15 (including the facing layer 16 and foam layer 17) of the instrument panel 1 are as follows.
SHEET
(1) Material Thickness:
    3.15 mm (=0.65 mm facing layer+2.5 mm foam layer)
(2) Thickness t1 with elongation of 0% to 50%:
    3.15–2.1 mm
(2) Thickness t2 with elongation of 50% to 120%:
    2.1–1.4 mm
(4) Facing layer
    (4a) Material: thermoplastic olefin (TPO) elastomer
    (4b) Material thickness: 0.65 mm
(5) Foam layer
    (5a) Material:polypropylene (PP)
    (5b) Material thickness: 2.5 mm
BASE MEMBER
(1) Material: polypropylene (PP)
(2) Thickness: 3.0 mm
(3) Vacuum grooves
    (3a) Width (W): 0.3–0.9 mm
    (3b) Depth (D): 0.3–2.0 mm
    (3c) Pitch (P1) when used with sheet with elongation of 0%–50%: 10 mm
    (3d) Pitch (P2) when used with sheet with elongation of 50%–120%: 5.0 mm As enumerated above, the width (W) of the vacuum grooves 11 is preferably in the range of 0.3 to 0.9 mm. Vacuum grooves of a width less than 0.3 mm will fail to create vacuum force or suction large enough to draw the sheet 1 down onto the profiled surface 10c of the base member 10. By contrast, vacuum grooves of a width greater than 0.9 mm will allow the sheet 15 to partly move into the vacuum grooves.

Similarly, the depth (D) of the vacuum grooves 11 is preferably in the range of 0.3 to 2.0 mm. A depth smaller than 0.3 mm will enable the vacuum grooves to create only small vacuum force or suction which is insufficient to draw the sheet 15 down onto the profiled surface 10c of the base member 10. By contrast, vacuum grooves having a width greater than 2.0 mm will lower the rigidity of the base member 11.

With the vacuum grooves 11 thus dimensioned, the sheet 15 can closely adhere to the profiled surface 10c of the base member 10 under vacuum or suction, and the sheet 15 bonded to the base member 10 has no sink mark or recess formed at a portion corresponding in position to any of the vacuum grooves 11 and vacuum holes 12.

Furthermore, since the base member 10 and the sheet 15 including the facing and foam layers 16, 17 are made from polypropylene-based material which is recyclable, the manufacturing cost of the instrument panel can be reduced by using recycled PP materials.

For use in combination with a portion of the sheet 15 which is designed to be elongated by 50% or below, the pitch of the vacuum grooves 11 is set to be 10 mm (P1). On the other hand, for a portion of the sheet 15 designed to be elongated by 50% to 120%, the vacuum grooves 11 are designed to have a pitch P2 of 5 mm. By changing the pitch of the vacuum grooves 11 based on the design elongations (corresponding to the design thicknesses) of portions of the sheet 15, it becomes possible to create vacuum or suction distributed substantially uniformly over the entire area of the sheet. The sheet 15 can closely adhere to the profiled surface 10c of the base member 10 over the entire area of the sheet 15. The vacuum grooves 11 with varying pitch can minimize the number of vacuum grooves 11 used and thus lower the manufacturing cost of a mold used for injection-molding the base member 10.

Figure 8:
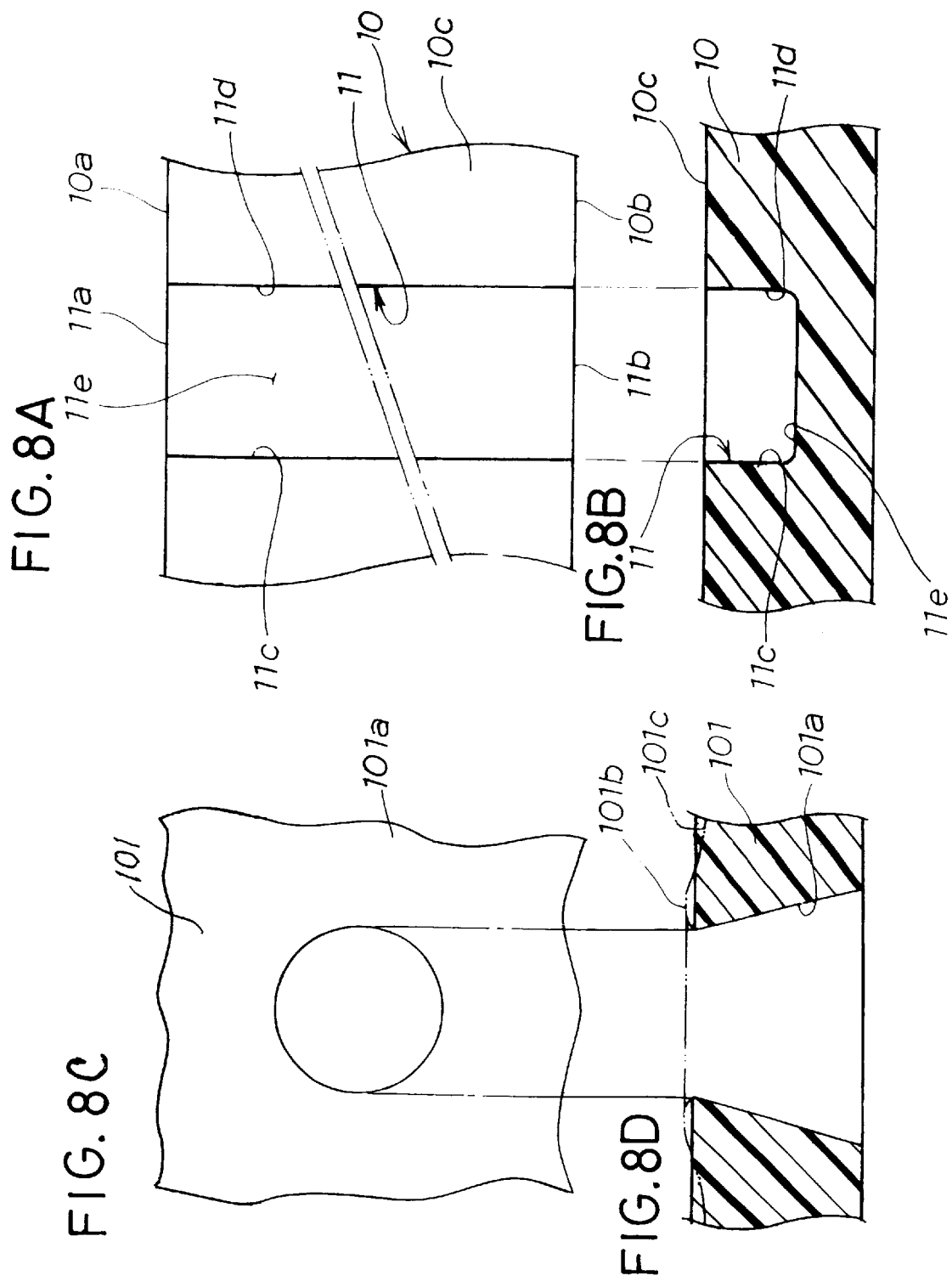
FIGS. 8A and 8B are a plan view and a longitudinal cross-sectional view, respectively, showing a configuration of the base member used in the vacuum covering method of the present invention.
FIGS. 8C and 8D are views corresponding to FIGS. 8A and 8B, respectively, showing for comparative purposes a configuration of the base member used in a conventional vacuum covering method.

The vacuum grooves 11 formed in the profiled surface 10c of the base member 10 are also effective to eliminate the influence of thermal shrinkage occurring when the base member 10 becomes cool after molding. As shown in FIG. 8A, each vacuum groove 11 extends from one end 11a of the base member 10 to the other end 11b across the profiled surface 10c. Additionally, the vacuum groove 11 has a relatively large surface area formed jointly by two opposed sidewalls 11c, 11d and a bottom wall 11e extending between the sidewalls 11c, 11d. By virtue of the large surface area of the vacuum groove 11, thermal shrinkage of the base member 10 caused when the base member 10 becomes cool is dispersed or distributed over the entire region of the base member 10. Consequently, there is no risk to generate a shrink mark (sink mark) or a projection on the profiled surface 10c of the base member 10 particularly in the vicinity of the vacuum grooves 11, as shown in FIGS. 8A and 8B. The profiled surface 10c is thus smooth and free of recesses and projections. A front sheet of the sheet 15 bonded to such smooth profiled surface 10c of the base member 10 is also smooth and free of recesses and projections and, hence, is attractive in appearance.

Unlike the base member 10 of the present invention, the conventional base member 101 (FIGS. 8C) injection-molded of synthetic resin undergoes thermal shrinkage which tends to concentrate on a center of each vacuum hole 101a. The thermal shrinkage thus concentrated generates an annular shrink mark (sink mark) 101c formed in the profiled surface in the vicinity of the vacuum hole 101a. As a result of generation of the shrink mark 101c, a peripheral edge portion 101b of the vacuum hole 101a is forced to swell or project outwardly from the profiled surface of the base member 101. When a sheet is drawn by vacuum down onto the profiled surface of the base member 101 to effect adhesive bonding between the sheet and the base member 101, the annular projecting edge 101b and sink mark 101c on the profiled surface will generate annular projection and an annular recess on the front surface of the sheet, making the sheet unsightly in appearance.

A variant of the vacuum covering method of the present invention will be described with reference to FIGS. 9, 10A, 10B and 11. These parts which are the same as or corresponding to those used in the embodiment described above with reference to FIGS. 3, 4A, 4B and 6 are designated by the same reference characters, and no further description thereof is needed.

Figure 9:
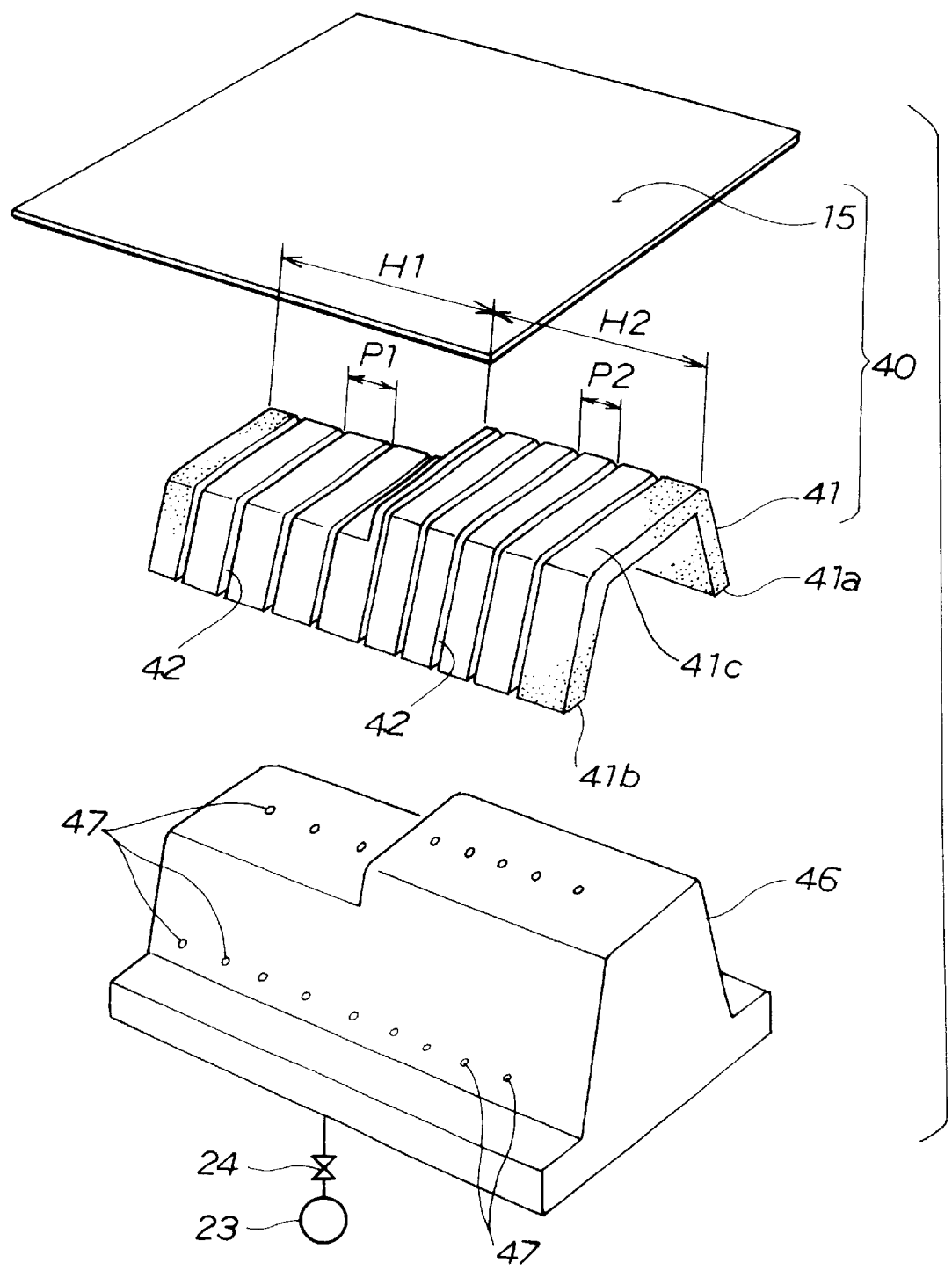
FIG. 9 is a view similar to FIG. 3, but showing a modification of the vacuum covering method according to the present invention.

As shown in FIG. 9, a base member 41 and a sheet 15 to be bonded together are provided. The sheet 15 is the same as the one used in the first embodiment shown in FIG. 3. The base member 41 differs from the one 10 in the first embodiment only in that the vacuum holes 12 are omitted. The base member 41 has a plurality of vacuum grooves 42 extending from one end 41a to the other end 41b of the base member 41 across a profiled surface 41c of the base member 41. The vacuum grooves 42 are the same in size and pitch as the vacuum grooves 11 of the first embodiment. The base member 41 devoid of vacuum holes can be manufactured at a lower cost than the base member 10 of the first embodiment because a mold used for injection-molding the base member 41 requires no movable pins and corresponding holes for forming vacuum holes and, hence, is simple in construction and can be manufactured inexpensively as compared to the mold used for injection-molding the base member 10.

Figure 10A:
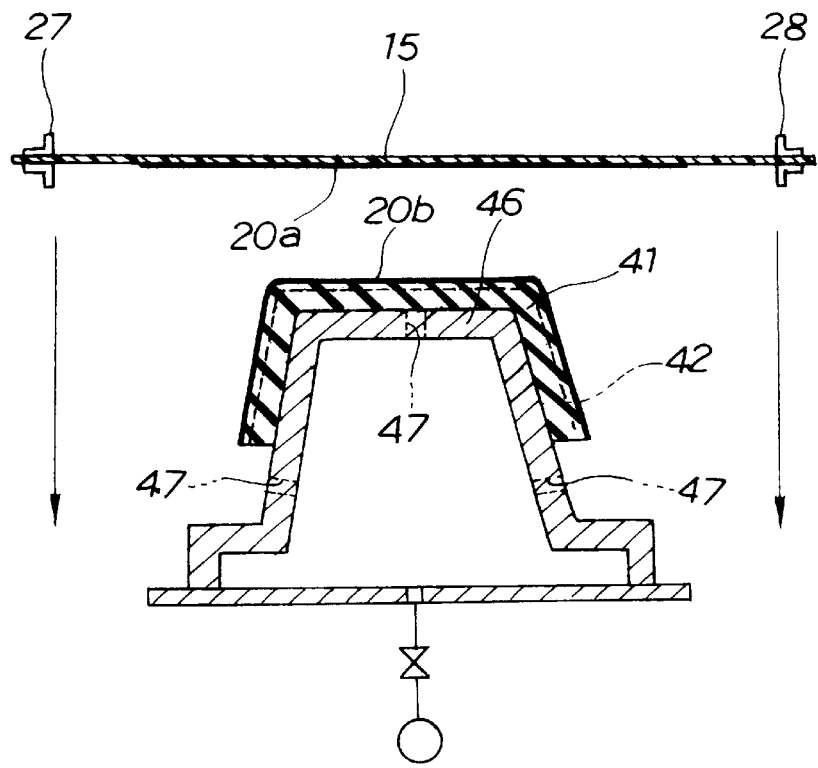
FIGS. 10A and 10B are schematic cross-sectional views showing the manner in which a sheet is drawn down onto a profiled surface of a base member under vacuum to effect adhesive bonding therebetween to form an instrument panel according to the modified vacuum covering method of the present invention.

Then, the base member 41 is set on a lower mold member 46 of a vacuum mold assembly of the vacuum covering apparatus. In this instance, vacuum holes 47 provided in opposite sidewalls of the lower mold member 46 are located below the opposite ends (side edges) 41a, 41b of the base member 41 and not closed by the base member 41, as shown in FIG. 10A. On the other hand, vacuum holes 47 provided in the top of the lower mold member 46 is closed by the base member 41. Thus, the lower mold member 46 differs in arrangement of the vacuum holes 47 from the lower mold member 22 in the first embodiment shown in FIG. 3. The vacuum holes 47 in the opposite sidewalls of the lower mold member 46 are held in fluid communication with the vacuum grooves 42 of the base member 41 when the lower mold member 46 and an upper mold member 48 (FIG. 10B) are mated together to close the vacuum mold assembly, so that air can be evacuated from the vacuum grooves 42 though the base member 41 even through the base member 41 has no vacuum holes interconnecting the vacuum grooves 42 and the vacuum holes 47 at the top of the lower mold member 46.

Subsequently, as shown in FIG. 4, a primer (prime coat) 20a is applied to one surface of the sheet 15. The sheet 15 is then stretched or tensioned with its opposite edges gripped by left and right clamps 27, 28 of the vacuum covering apparatus. The sheet 15 while being kept in the prestretched condition is heated until it becomes soft. An adhesive 20b is applied to the profiled surface 41c (FIG. 9) of the base member 41, then heated at a predetermined temperature. Thereafter, the left and right clamps 27, 28 move downwards to place the sheet 15 over the profiled surface 41c of the base member 41.

Figure 10B:
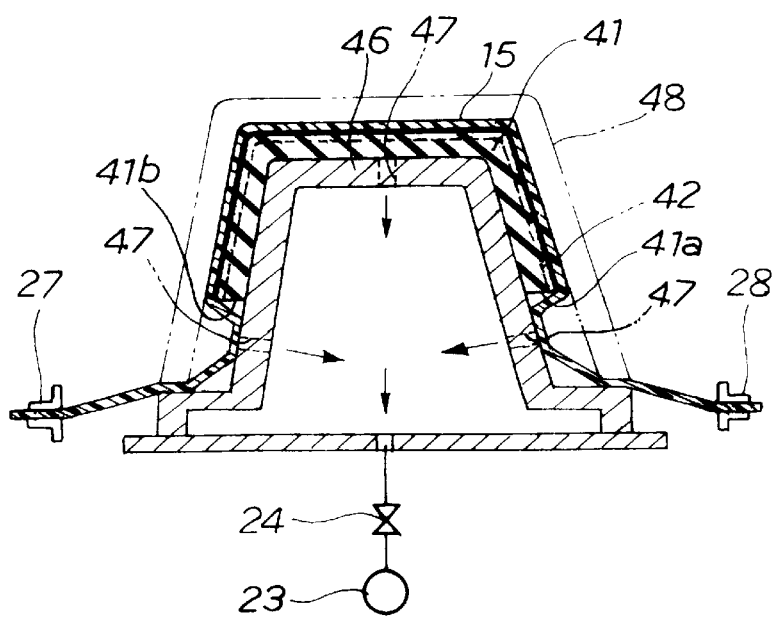

Then, an upper mold member 48 is descended toward the lower mold member 20 to close the vacuum mold assembly, as shown in FIG. 10B. In this instance, the vacuum grooves 47 of the base member 41 form vacuum passages defined between the prime-coated surface of the sheet 15 and the adhesive-coated profiled surface 41c (FIG. 9) of the base member 41. The vacuum passages (vacuum grooves 47) extend transversely across the profiled surface 41c of the base member 41. Subsequently, the vacuum source (vacuum pump) 23 is activated and the shut-off valve 24 is open whereupon air is exhausted from the vacuum mold assembly through the vacuum holes 47 in opposite sidewalls of the lower mold member 46, the vacuum grooves 42 in the base member 41. As the vacuum passages (vacuum grooves 47) are evacuated, the sheet 15 is drawn by vacuum or suction down onto the profiled surface 41c of the base member 41 to thereby effect firm bonding between the sheet 15 and the profiled surface 41c of the base member 41 by means of the adhesive 20b.

Since the vacuum holes 47 in opposite sidewalls of the lower mold member 46 are located below the opposite side edges 41a, 41b of the base member 41, those portions of the sheet 15 extending in confrontation with the vacuum holes 47 are drawn by suction until they abut flatwise against the opposite sidewalls of the lower mold member 46, as shown in FIG. 10B. Consequently, the base member 41 is fully embraced or grasped from opposite sides with the sheet 15, and the bonding strength between the sheet 15 and the base member 41 is enhanced particularly at portions or areas extending along opposite side edges 41a, 41b of the base member 41. Additionally, by virtue of the vacuum grooves 42 provided with predetermined size and distribution over the entire area of the profiled surface 41 of the base member 41, vacuum force or suction generated in the vicinity of the vacuum grooves 42 acts on the sheet 15 substantially uniformly over the entire area of the sheet 15 lying over the profiled surface 41c of the base member 41. Thus, there is no risk of generating a recess on a front surface of the sheet 15 at a portion corresponding in position to each of the vacuum grooves 42 of the base member 41.

Figure 11:
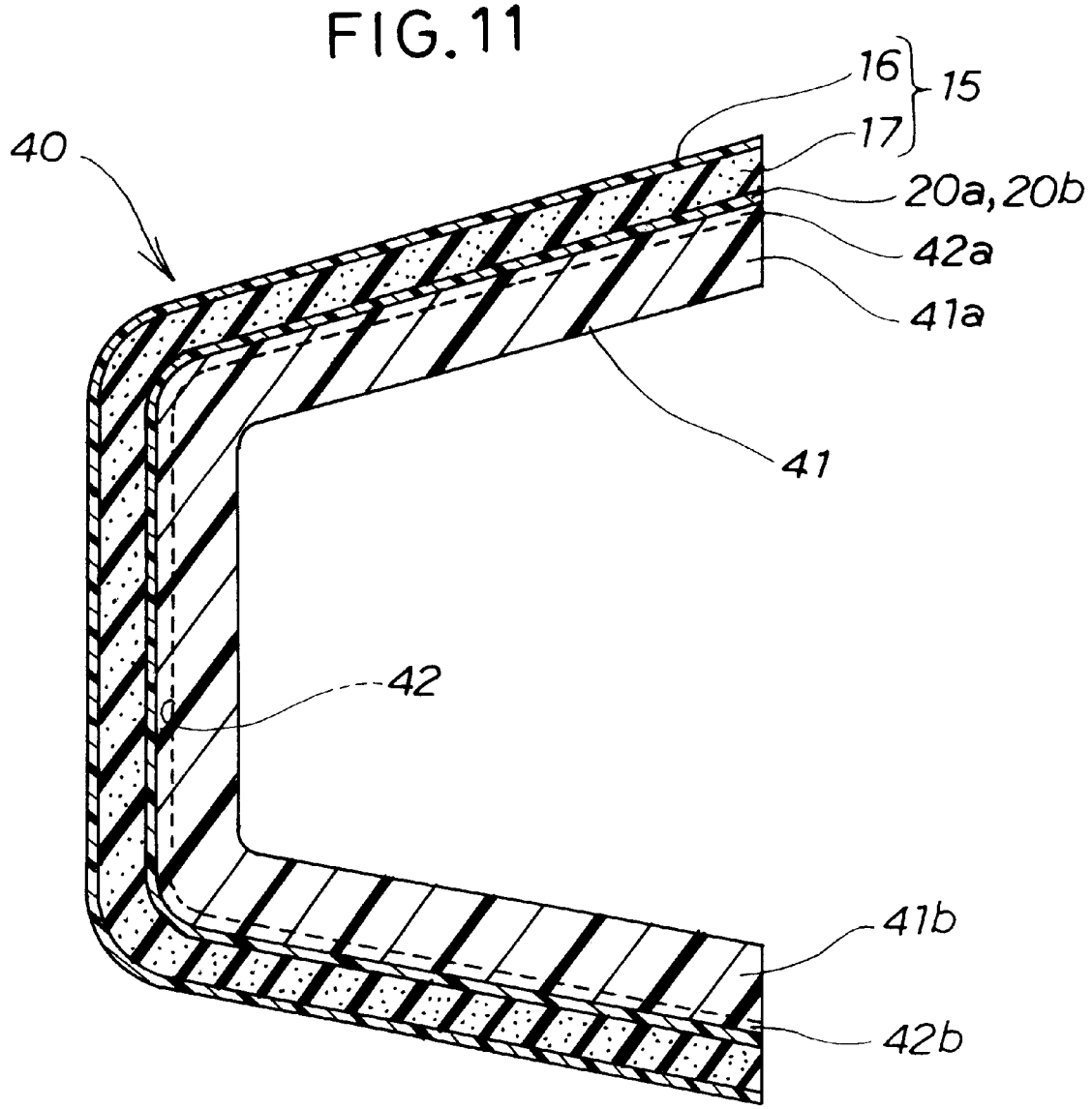
FIG. 11 is an enlarged transverse cross-sectional view of the instrument panel produced by the modified vacuum covering method shown in FIGS. 10A and 10B.

Thereafter, at the end of a predetermined time period, the upper mold member 48 is moved upwardly to open the vacuum mold assembly, and the left and right clamps 27, 28 release the opposite ends of the sheet 15. Then, the base member 41 covered with the sheet 15 is removed from the lower mold member 46. After trimming the sheet 15, a laminated article (instrument panel) 40 such as shown in FIG. 11 is obtained.

The primer (primary coat) 20a applied to one surface of the sheet 15 to improve the bonding properties of the sheet 15 relative to the adhesive 20b used in combination may be replaced by a corona discharge treatment applied to one surface of the sheet 15.

As described above, the injection-molded base member according to the present invention has vacuum grooves extending across a profiled surface of the base member in place of the conventional vacuum holes extending across the thickness of the base member. By virtue of the vacuum grooves, thermal shrinkage occurring when the base member becomes cool after injection-molding is substantially uniformly distributed over the entire area of the base member and thus absorbed without generating shrink marks (sink marks) or projections on the profiled surface. Thus, the profile surface of the base member is smooth and free from projections and recesses. A sheet bonded to the smooth, projection-and-recess-free profiled surface of the base has a smooth front surface free from projection and recess, so that a resulting article is attractive in appearance.

When the heated sheet is placed over the profiled surface of the base member under prestretched condition, that part of the sheet lying over a convex part of the profiled surface is slightly elongated, and a result of this elongation, thickness of that sheet part reduces. Since the elongated thin sheet part can be easily distorted or flexed as compared to other parts not subjected to elongation, a corresponding part of the vacuum grooves requires a pitch which is small enough to prevent the sheet from flexing or distorting when air is evacuated from the vacuum grooves to draw the sheet by vacuum down onto the profiled surface of the base member to effect adhesive bonding between the sheet and the base member. By contrast, for a sheet part not subjected to material elongation, the aforesaid thickness reduction does not occur. This sheet part is resistant to distortion or bending and hence can be used in combination with vacuum grooves provided at a relatively large pitch. Thus, the pitch of the vacuum grooves is preferably set to vary inversely with the elongation of the sheet. With this setting, it becomes possible to minimize the number of vacuum grooves, leading to reduction of manufacturing cost of a mold assembly used for the injection-molding of the base member.

The width and depth of the vacuum grooves are so dimensioned as to generate vacuum force or suction which is sufficient to draw the sheet down onto the profiled surface of the base member and keep the sheet in close face-to-face contact with the profiled surface without causing local sinking or recession at portions corresponding in position to the individual vacuum grooves. A preferable range is 0.3 to 0.9 mm for the vacuum-groove width and 0.3 to 2 mm for the vacuum-groove depth.

Figure 12:
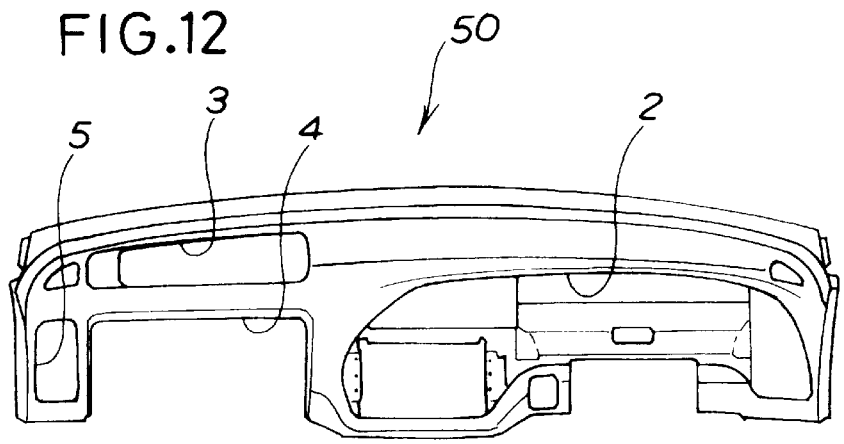
FIG. 12 is a front elevational view of an automotive instrument panel which represents an article produced by a vacuum covering method according to a second embodiment of the present invention.

Referring now to FIG. 12, there is shown an instrument panel 50 for motor cars which represents a laminated article produced by a second embodiment of the vacuum covering method of the present invention. The instrument panel 50 has the same external shape as the instrument panel 1 of a first embodiment shown in FIG. 1. Accordingly, these parts which are like or corresponding to those of the instrument panel 1 are designated by the same reference characters, and further description thereof can be omitted.

Figure 13:
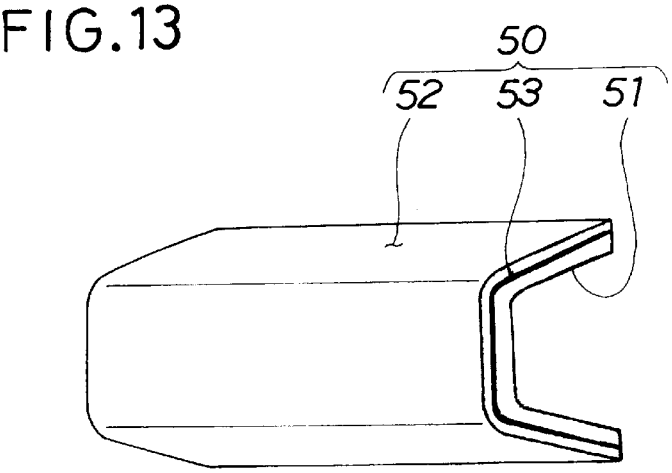
FIG. 13 is a perspective view showing the instrument panel of FIG. 12 in a simplified form for convenience of explanation.

FIG. 13 illustrates the instrument panel 50 in a simplified form for convenience of explanation. The instrument panel 50 is generally U-shaped in transverse cross section and has a laminated structure composed of a generally channel-shaped base member 51 injection-molded of synthetic resin, a sheet 52 of thermoplastic material bonded to one surface of the base member 51, and an adhesive layer 53 disposed between the sheet 52 and the base member 51. The surface of the base member 51 to which the sheet 52 is bonded is profiled to have a desired design and configuration and this surface is hereinafter referred to as "profiled surface".

The base member 51 is injection-molded from polypropylene. Unlike the base member 10 of the first embodiment shown in FIGS. 2 and 3, this base member 51 does not have any groove extending across the profiled surface 51a (FIG. 14), or a hole extending across the thickness of the base member 31, for generating vacuum force or suction acting to draw the sheet 52 down onto the profiled surface 51a (FIG. 14) to effect adhesive bonding between the sheet 52 and the profiled surface 51a. The profiled surface 51a of the base member 51 is thus devoid of vacuum grooves and hence is smooth over the entire area thereof. It can be appreciated that due to the omission of the vacuum grooves and holes, a mold assembly used for injection-molding the base member 51 is simple in construction and can be manufactured inexpensively as compared to the mold assembly used for producing the base member 10. Thus, the base member 51 can be manufactured at a lower cost than-the base member 10 of the first embodiment.

Figure 14:
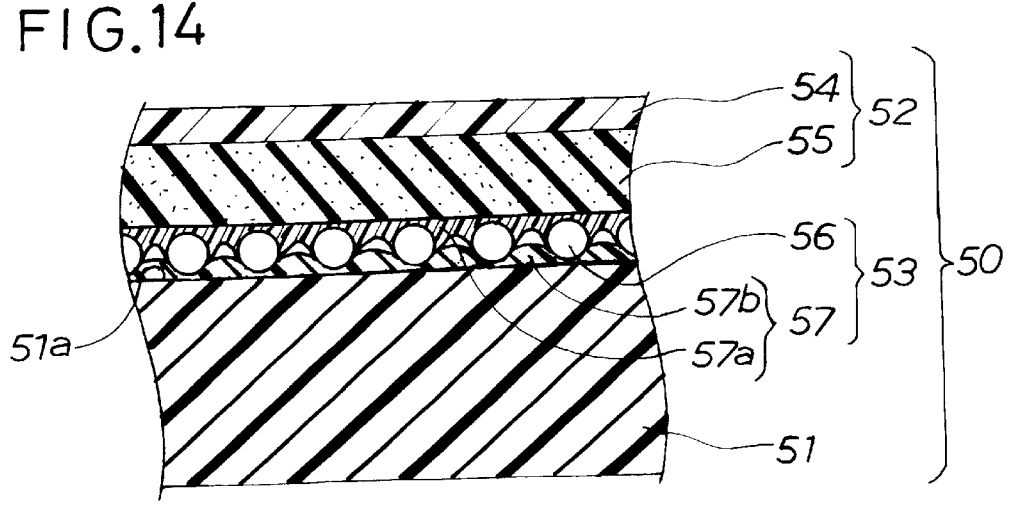
FIG. 14 is a cross-sectional view of a portion of the instrument panel shown in FIG. 13.

As shown in FIG. 14, the sheet 52 has a double-layered structure including a facing layer 54 of polypropylene, and a foam layer 55 of polypropylene on the back of the facing layer 54. The facing layer 54 and the foam layer 55 are substantially impermeable to air.

The adhesive layer 53 is comprised of a multiplicity of small particles 56 disposed between the sheet 52 and the base member 51 (more specifically between an outside surface of the foam layer 55 of the sheet 51 and the profiled surface 51a of the base member 51), and a composite adhesive 57 used for bonding together the sheet 52 and the base member 51 with the small particles 16 sandwiched therebetween. The particles 56 thus used serve to provide vacuum passages for ensuring that the sheet 52 is drawn down onto the profiled surface 51a of the base member 51 by vacuum force or suction generated in the vicinity of the vacuum passages when air is evacuated from the vacuum passages.

The particles 56 are spherical beads of polypropylene, for example, and have a diameter which preferably ranges from 0.1 to 0.3 mm. A particle diameter below 0.1 mm will fail to create sufficient vacuum force or suction to draw the sheet down onto the profiled surface 51a of the base member 51. By contrast, a particle diameter above 0.3 mm may generate recessed portions on a front surface of the sheet 52 at a position corresponding to the position of the individual particles 56.

The composite adhesive 57 is composed of a primer 57a applied to one of the outside surface of the foam layer 55 and the profiled surface 51a of the base member 55, and an adhesive 57b coated on the other of the outside surface of the foam layer 55 and the profiled surface 51a of the base member 55. The primer 57a is used to improve the bonding properties of the sheet 52 relative to the adhesive 57b applied to the profiled surface 51a of the base member 51.

The instrument panel 50 of FIG. 12, which is shown in simplified form in FIG. 13, is produced in a manner described below with reference to FIGS. 15–21.

Figure 15:
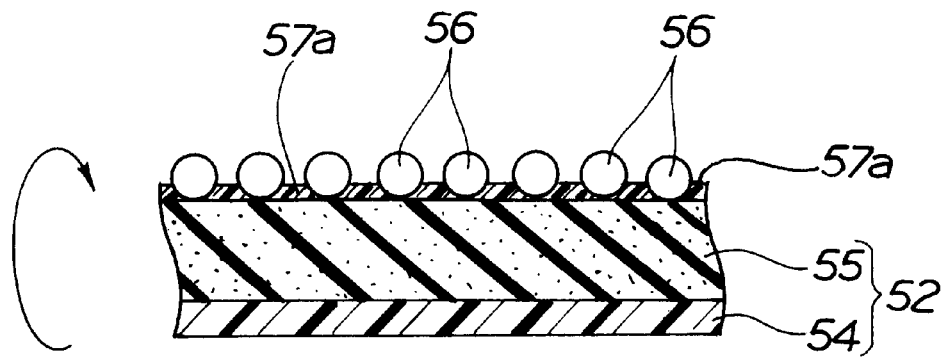
Figure 16:
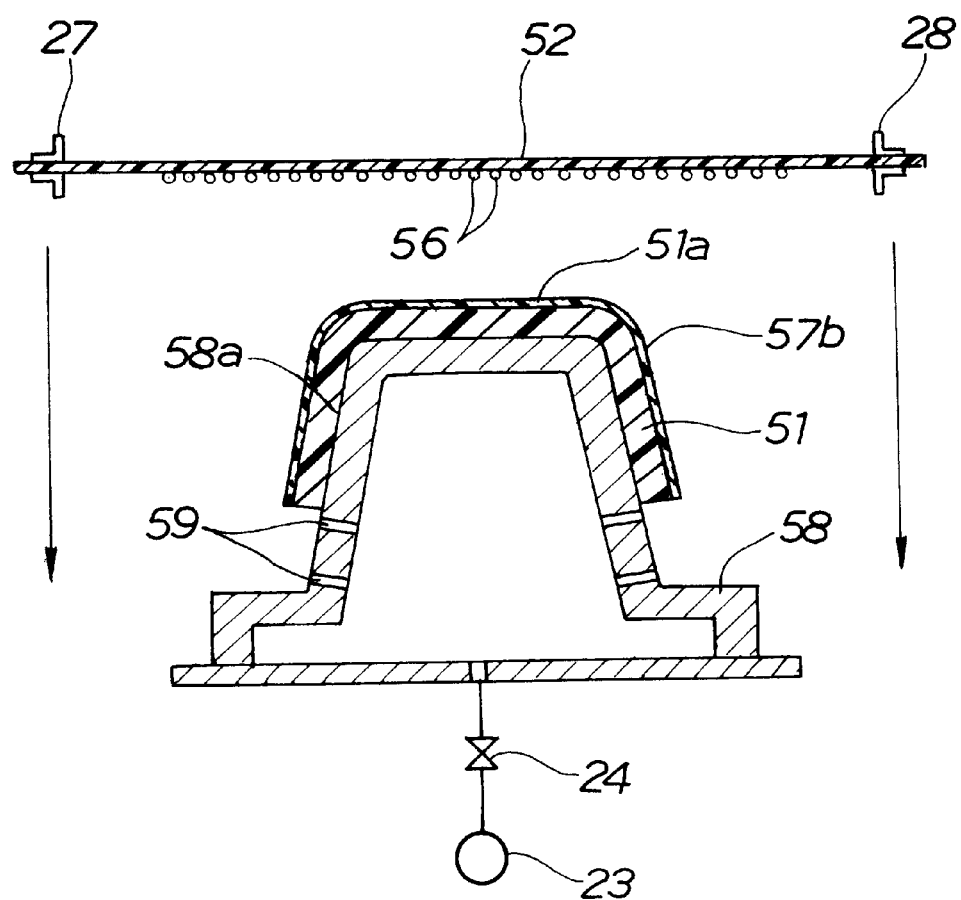

At first, an injection-molded, channel-shaped polypropylene base member 51, and a thermoplastic sheet 52 having a double-layered structure including a polypropylene facing layer 54 and a polypropylene foam layer 55 are provided (cf. FIGS. 15 and 16).

Then, as shown in FIG. 15, a primer 57a is applied to the back side of the sheet 52 (outside surface of the foam layer 55) and, subsequently, polypropylene particles 56 are splayed onto the prime-coated surface of the sheet 52. In this instance, in order to provide a sufficient space or clearance between the base member 51 and the sheet 52 for enabling the sheet 52 to be drawn down onto the profiled surface 51a of the base member 51 under vacuum, the coating thickness of the primer 75a is set to be in the range of 0.03 to 0.05 mm when used in combination with particles 56 of a diameter of 0.1 mm and in the range of 0.05 to 0.1 mm when used with particles 56 of a diameter of 0.3 mm. The sheet 52 with the polypropylene particles 56 carried on the primer-coated surface is thereafter turned front side back or reversed, as indicated by the arrow shown in FIG. 15.

Then, using the same vacuum covering apparatus as the first embodiment shown in FIG. 4A except for a vacuum mold assembly, the injection-molded, channel-shaped polypropylene base member 51 is set on a lower mold member 58 of the vacuum mold assembly, as shown in FIG. 14. The lower mold member 58 is hollow in shape and has an outside surface 58a complementary in contour to the inside surface of the channel-shaped base member 51. Each of opposite sidewalls of the lower mold member 58 has two vertically spaced rows of vacuum holes 59 arranged longitudinally along a lower portion which is not covered by the base member 51 when the base member 51 is set on the lower mold member 58. The vacuum holes 59 have one end opening at the outside surface 58*a* of the lower mold member 58 and the other end connected to the vacuum source (vacuum pump) 23 via the shut-off valve 24.

Subsequently, an adhesive 57*b* is applied to the profiled surface 51*a* of the base member 51, and after that sheet 52 is stretched with its opposite edges gripped by left and right clamps 27, 28 of the vacuum covering apparatus. The sheet 52 while kept in the prestretched condition is heated until it becomes soft. Then, the left and right clamps 27, 28 are lowered as indicated by the arrows in FIG. 16 so that the sheet 52 is placed over the profiled surface 51*a* of the base member 51. In this condition, the prime-coated surface of the sheet 52 and the adhesive-coated profiled surface 51*a* of the base member 10 face each other with a space or clearance S (see FIG. 18) defined therebetween by virtue of the polypropylene particles 56 carried on the prime-coated surface of the sheet 52. Since the particles 56 are distributed over the back side of the sheet 52, the clearance S is divided by the particles 56 into a multiplicity of vacuum grooves 60 extending continuously across the prime-coated surface of the sheet 52 and the adhesive-coated profiled surface 51*a* of the base member 51.

Figure 17:
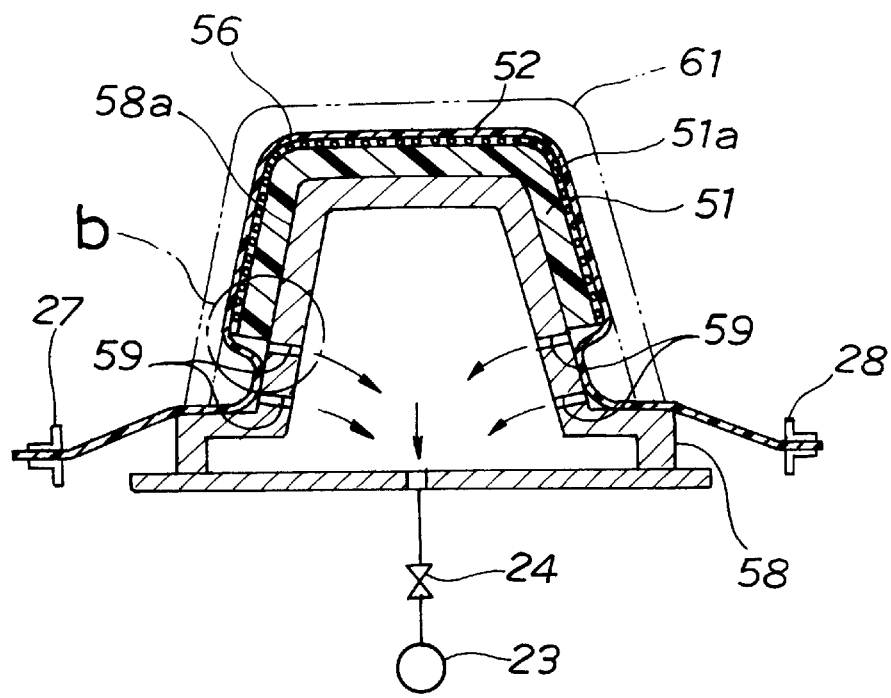

Then, as shown in FIG. 17, an upper mold member 61 moves downwards toward the lower mold member 58 to close the vacuum mold assembly with the sheet 52 and the base member 51 held therein. Subsequently, the vacuum source (vacuum pump) 23 is activated and the shut-off valve 24 is open whereupon air in the vacuum mold assembly is extracted through the vacuum holes 59 in the lower mold member 58 and the vacuum passages 61 defined by the particles 56 between the sheet 52 and the base member 51, as indicated by arrows shown in FIGS. 17 and 18. During that time, the sheet 52 is drawn down onto the adhesive-coated profiled surface 51*a* of the base member 51 by a vacuum force or suction.

As the evacuating process proceeds, air is completely evacuated or exhausted from the vacuum passages 60 (FIG. 18) with the result that the particle-carrying surface of the sheet 52 is brought into close contact with the profiled surface 51*a* of the base member 51 with a composite adhesive layer 57 (consisting of the primer 57*a* and the adhesive 57*b*) disposed therebetween, as shown in FIG. 21. As a result, the sheet 15 and the base member 10 are tightly bonded together by means of the composite adhesive layer 57. As best shown in FIG. 14, the primer 57*a* and the adhesive 57*b* of the composite adhesive layer 57 enter between the adjacent particles 56 and stick together so that the particles 56 are embedded in the composite adhesive layer 57.

Figure 18:
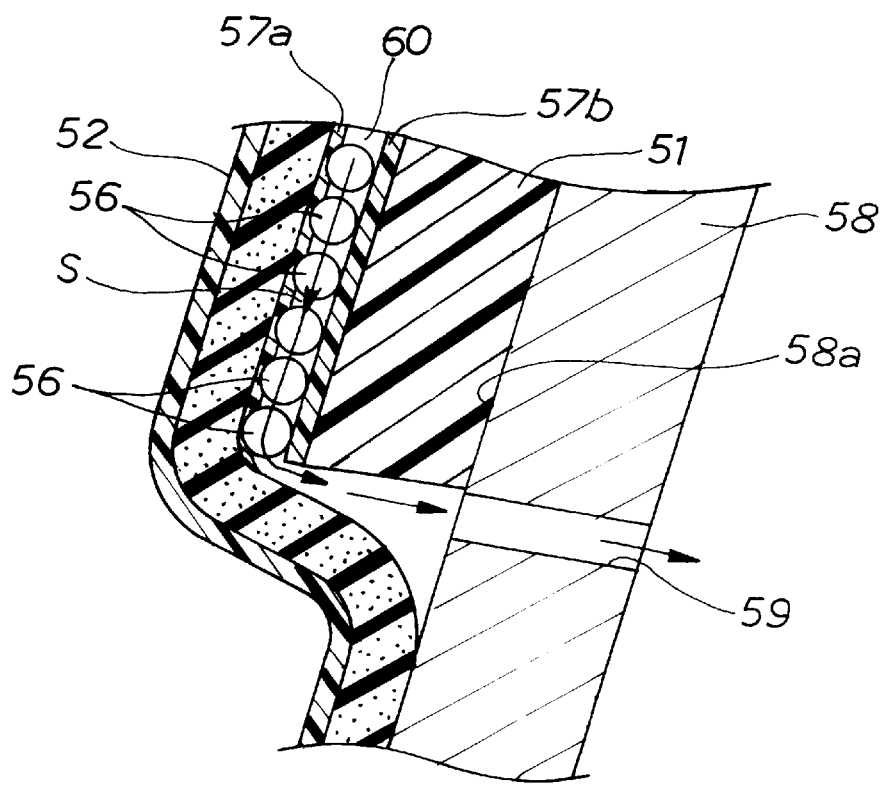

The above-mentioned two stages shown in FIGS. 18 and FIG. 21 of the vacuum covering process may be represented by conditions shown in FIG. 19 and FIG. 20, respectively, which illustrate the principle of the vacuum drawing process with respect to a bag 62. In FIGS. 19 and 20, numeral 31 denotes a pipe connected at one end to an open end 62*a* of the bag 62 and at the opposite end to a vacuum source, such as the one 23 shown in FIG. 17.

As described above, according to the second embodiment of the vacuum forming method of the present invention, small particles 56 are disposed between the base member 51 and the sheet 52 to provide a clearance S therebetween so that when air is evacuated from the clearance S (i.e., the vacuum passages 60 divided by the particles 56), the sheet 52 is drawn by vacuum or suction down onto the base member 51 to thereby effect firm bonding between the prime-coated, particle-carrying surface of the sheet 52 and the adhesive-coated profiled surface 51*a* of the base member 51. Since the base member 51 is completely free from holes or grooves used for evacuation, a mold assembly used for injection-molding the base member 51 can be manufactured at a low cost. This enables cost reduction of the base member 51 and the instrument panel 50.

In the second embodiment, the base member 51, sheet 52 and particles 56 are all made from polypropylene or polypropylene-based materials. However, the materials for these parts 51, 52 and 56 should by no means be limited to those used in the illustrated embodiment. For instance, when a base member and a sheet both made from a material other than polypropylene are used, particles are preferably formed from a material having a good affinity for the material of the base member and sheet.

Although the particles 56 in the illustrated embodiment have a spherical shape, any other shape may be used for the particles 56 provided that a clearance sufficient to generate vacuum force or suction large enough to draw the sheet down onto the base member can be provided between the sheet and the base member, without generating recessed portions on a front surface of the sheet at a position corresponding to the position of the particles 56. Additionally, the primer 57*a* coated on the back of the sheet 52 may be replaced with the same material as the adhesive 57*b* applied to the profiled surface 51*a* of the base member 51.

Figure 22:
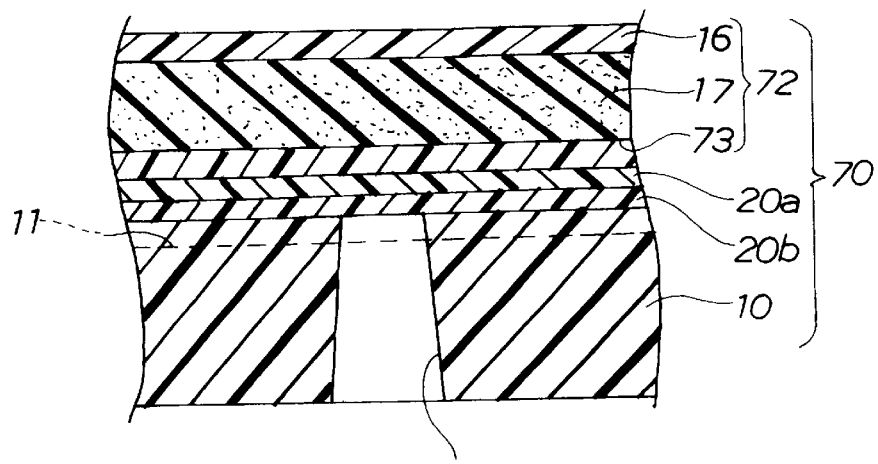
FIG. 22 is a fragmentary cross-sectional view of an instrument panel produced by the vacuum covering method of the first embodiment with a modification achieved by using a sheet having a barrier layer.
Figure 23:
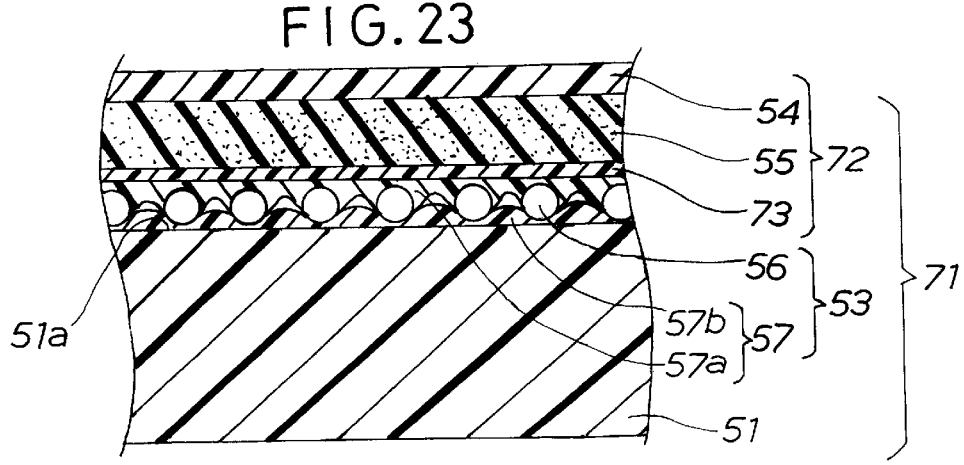
FIG. 23 is a view similar to FIG. 22, but showing another instrument panel produced by the vacuum covering method of the second embodiment.

FIG. 22 shows in cross section the structure of another example of the instrument panel 1 produced according to the first embodiment of the vacuum covering method of the present invention shown in FIGS. 1–8. Similarly, FIG. 23 illustrates structure of another example of the instrument panel 50 produced according to the second embodiment of the vacuum covering method of the present invention shown in FIGS. 12–21. These instrument panels 70, 71 differ from the corresponding instrument panels 1, 50 only in the structure of the sheet used therein.

More specifically, unlike the sheet 15, 52 of the instrument panels 1, 50, a sheet 72 of the instrument panels 70, 71 further has a barrier layer 73 on the back side of the foam layer 17, 55 which is opposite from the facing layer 16, 54. The barrier layer is formed from polypropylene, for example, and has a modulus of elasticity preferably in the range of 3.0 to 5.0 kg/cm$^2$. A modulus of elasticity smaller than 3.0 kg/cm$^2$ will allow the barrier layer 73 to distort or flex toward the vacuum passages provided between the sheet 72 and the base member 10, 51 (in the form of vacuum grooves 11 in the base member 10 shown in FIG. 22, or spaces between the adjacent particles 56) when the sheet 72 is drawn by vacuum or suction down onto the profiled surface of the base member 10, 51 during the evacuating process. By contrast, a barrier layer 73 having a modulus of elasticity greater than 5.0 kg/cm$^2$ will deteriorate the formability of the sheet which is required when the sheet is subjected to the deep drawing process. The facing layer 15, 54 is formed from thermoplastic olefin-based elastomer and has a modulus of elasticity of 0.02 to 2 kg/cm$^2$.

The barrier layer 73 having a higher modulus of elasticity than the facing layer 16, 54 can prevent the foam layer 17, 55 from entering the vacuum passages when air is evacuated from the vacuum passages to draw the sheet 72 down onto the profiled surface of the base member 10, 51 to effect adhesive-bonding between the sheet 72 and the base member 10, 51. The facing layer 16, 54 provided on the foam layer 17, 55 is, therefore, free from depressions and does not deteriorate the esthetical appearance of the sheets 70, 71 even when the facing layer 16, 54 is made from a soft plastic material, such as the aforesaid thermoplastic olefin-based elastomer. The facing layer 16, 54 of thermoplastic olefin-based elastomer is advantageous over the conventional PVC facing layer in that olefin-based elastomer is recyclable.

Figure 24:
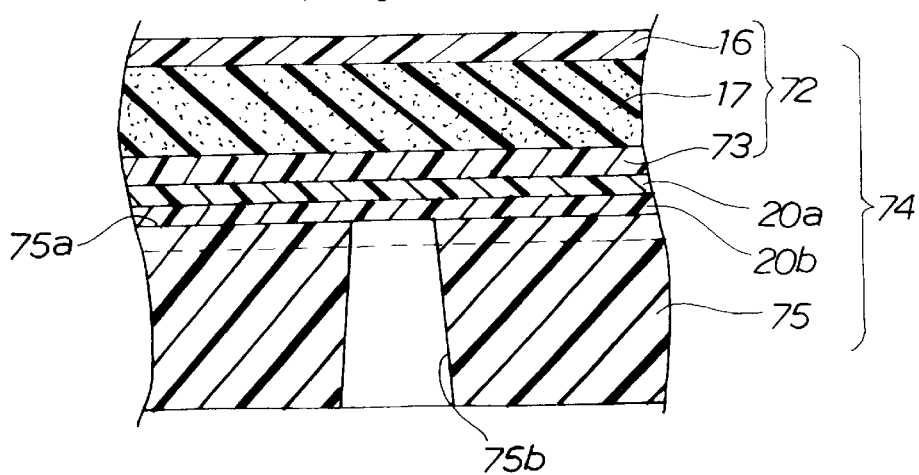
FIG. 24 is a fragmentary cross-sectional view of still another instrument panel produced by the vacuum covering method of the present invention.

An instrument panel 74 shown in FIG. 24 differs from the one 70 shown in FIG. 22 in that a base member 75 has no vacuum grooves extending transversely across a profiled surface 75a thereof, and a multiplicity of vacuum holes 75b extending across the thickness of the base member 75 are provided over the entire area of the base member 75.

Figure 29:
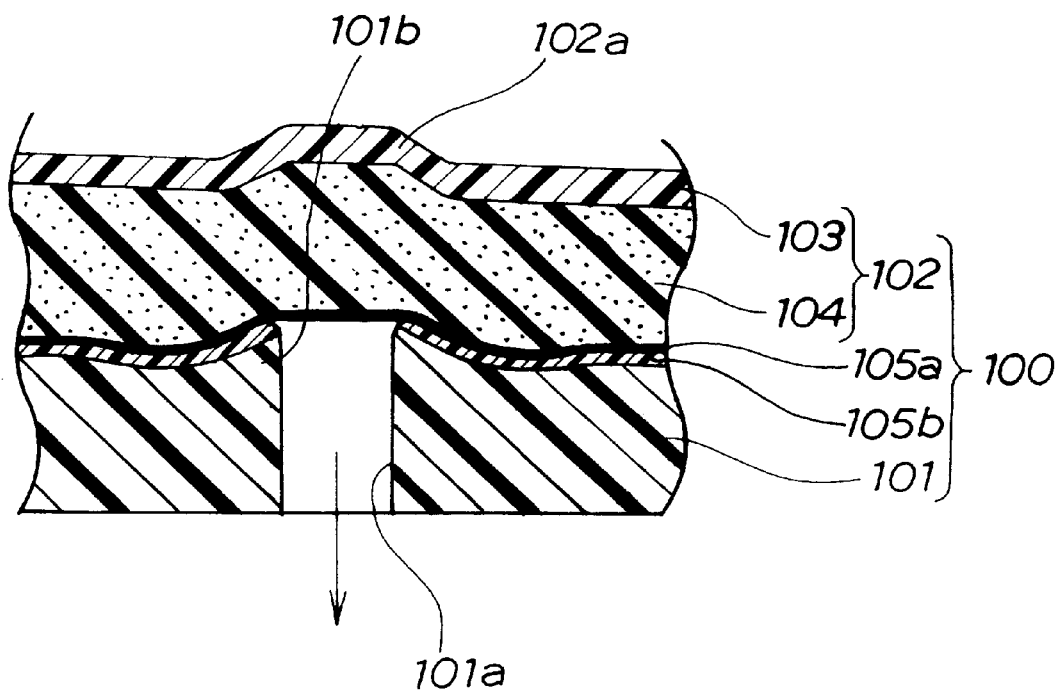
FIG. 29 is a fragmentary cross-sectional view of an automotive instrument panel produced by a conventional method.
Figure 30:
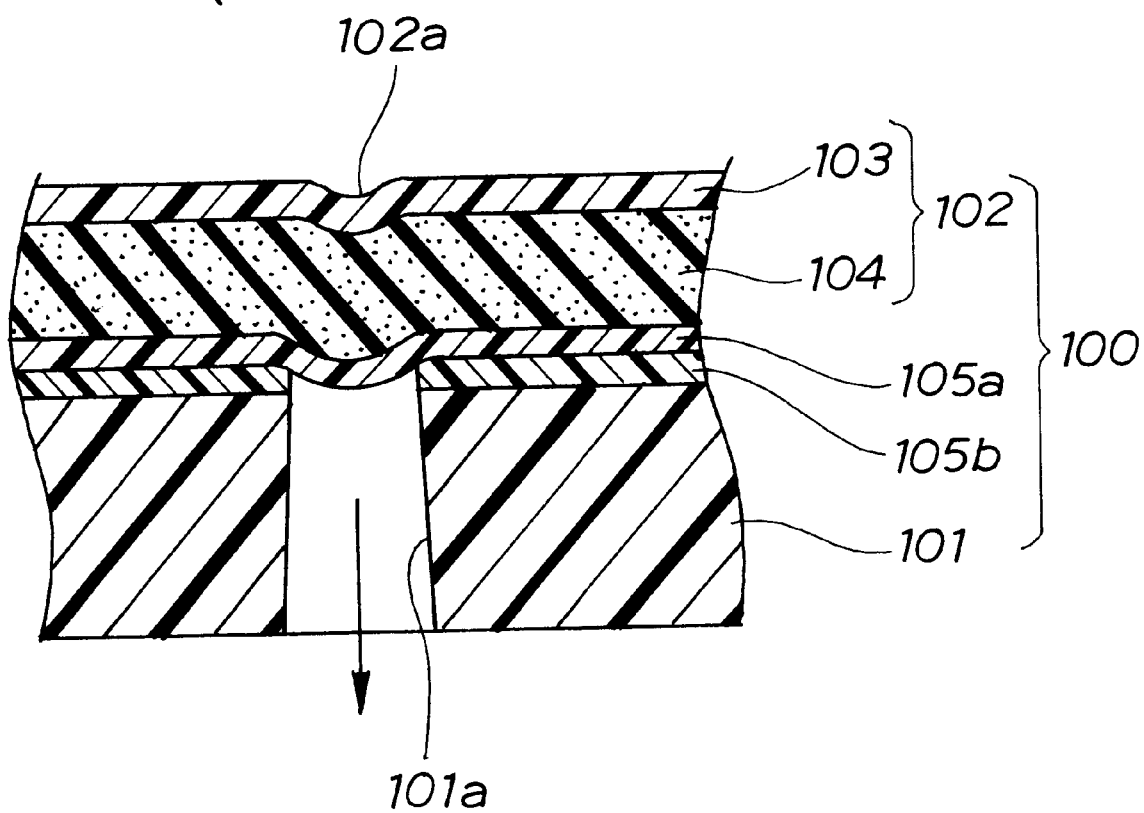
FIG. 30 is a fragmentary cross-sectional view illustrative of a problem associated with a conventional instrument panel.

In the case of the base member 75 thus constructed, it occurs likely that vacuum or suction generated during the evacuating process concentrates on the respective vacuum holes 75b, tending to pull the foam layer 17 into the vacuum holes 75b if the barrier layer 73 is not provided as in the case of a conventional article shown in FIG. 30. In FIG. 30 the same parts which are like or corresponding to those shown in FIG. 29 are designated by the same reference characters.

Advantageous results obtained by the barrier layer 73 will be described below with reference to FIGS. 25–28 which show a vacuum covering method achieved to produce the article shown in FIG. 24.

Figure 25:
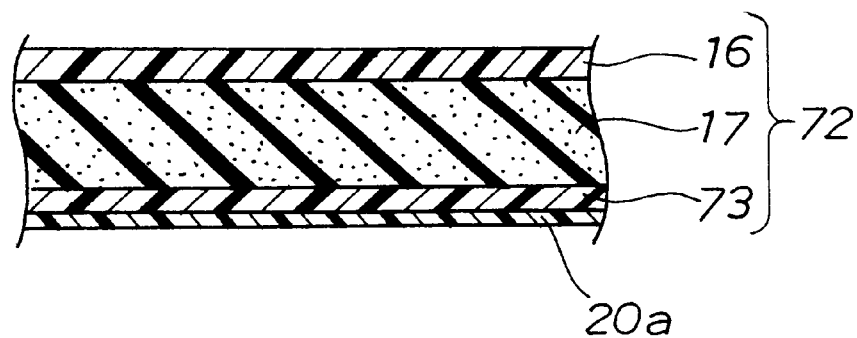
FIGS. 25 to 27 are diagrammatical cross-sectional views illustrative of a sequence of processing steps of the vacuum covering method to produce the instrument panel shown in FIG. 24.
Figure 26:
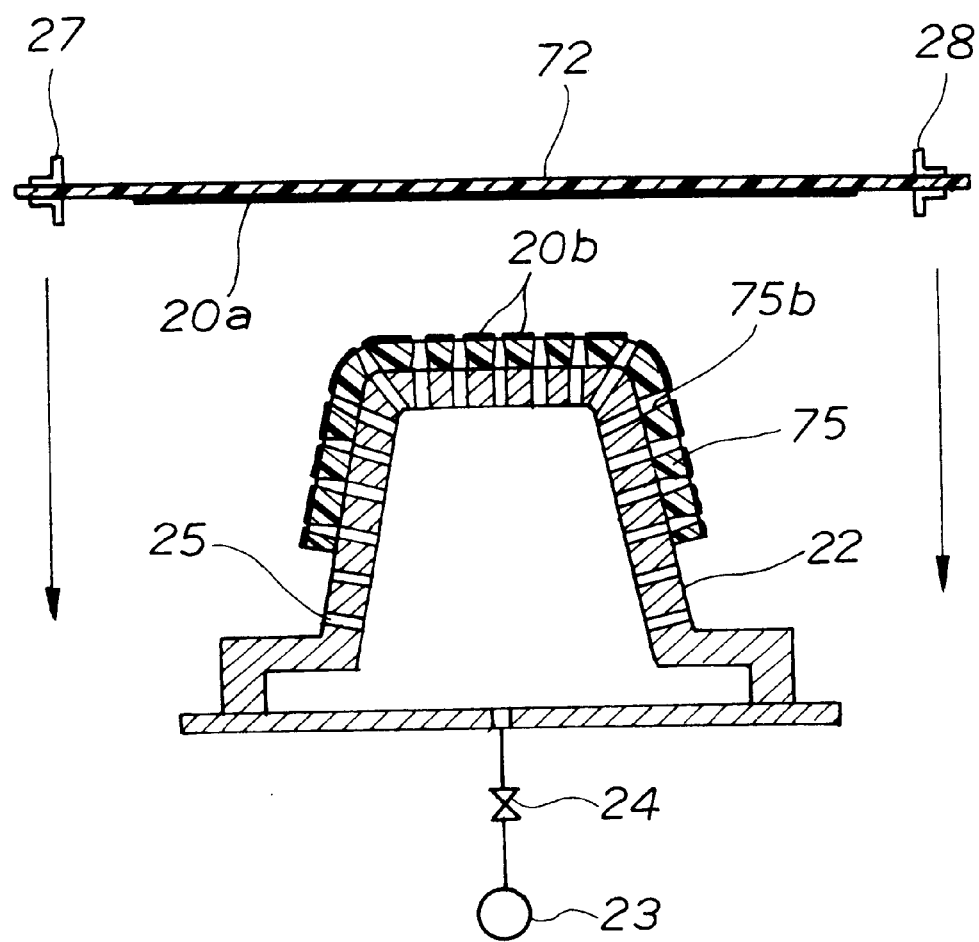

At first, a thermoplastic sheet 72 and a base member 75 injection-molded of polypropylene are provided. As shown in FIG. 25, the sheet 72 has a triple-layered structure including a facing layer 16 of thermoplastic olefin-based elastomer, a foam layer 17 of polypropylene and a barrier layer 73 of polypropylene arranged one upon another in the order named. The facing layer 16 has a modulus of elasticity ranging from 0.02 to 2 kg/cm$^2$, and the barrier layer 73 has a modulus of elasticity ranging from 3.0 to 5.0 kg/cm$^2$. The injection-molded base member 75 has a number of vacuum holes 75b provided at substantially uniform distribution over the entire area of the base member 75, as shown in FIG. 26.

The base member 75 is set on a lower mold member 22 of a vacuum mold assembly with its profiled surface 75a (FIG. 24) facing outwards. The vacuum holes 75b of the base member 75 are in fluid communication with vacuum holes 25 of the lower mold member 22, as shown in FIG. 26.

Then, a primer (prime coat) 20a is applied to the barrier layer 73 of the sheet 72, as shown in FIG. 25. The sheet 72 is stretched with its opposite edges gripped by left and right clamps 27, 28 of the vacuum covering apparatus. The sheet 72 while kept in the prestretched condition is then heated until it becomes soft. An adhesive 20b is applied to the profiled surface 75a (FIG. 24) of the base member 75 and then heated at a predetermined temperature. Subsequently, the clamps 27, 28 are lowered to place the sheet 72 over the profiled surface 75a of the base member 75.

Figure 27:
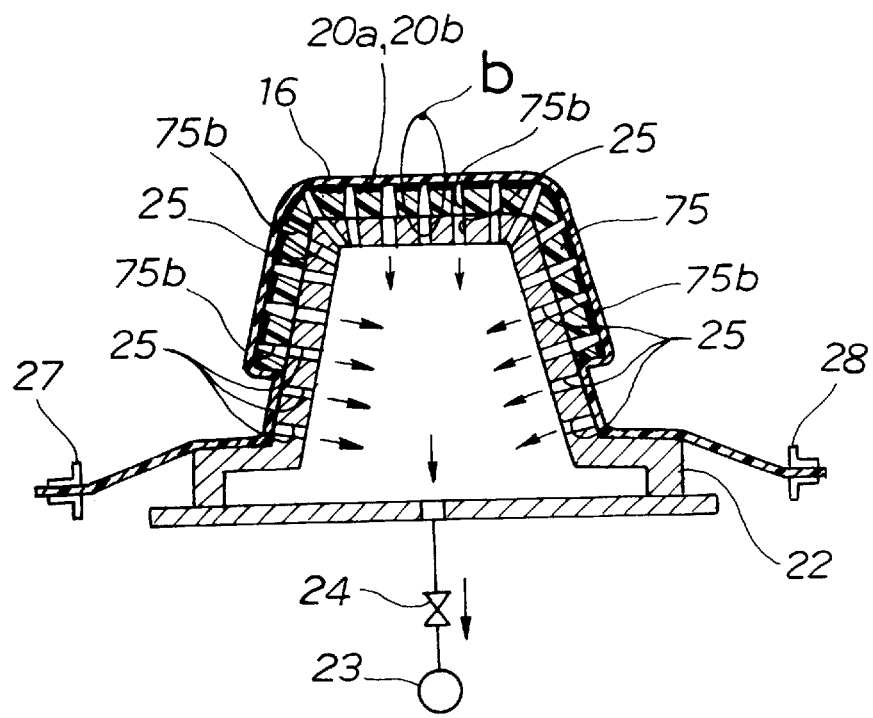
Figure 28:
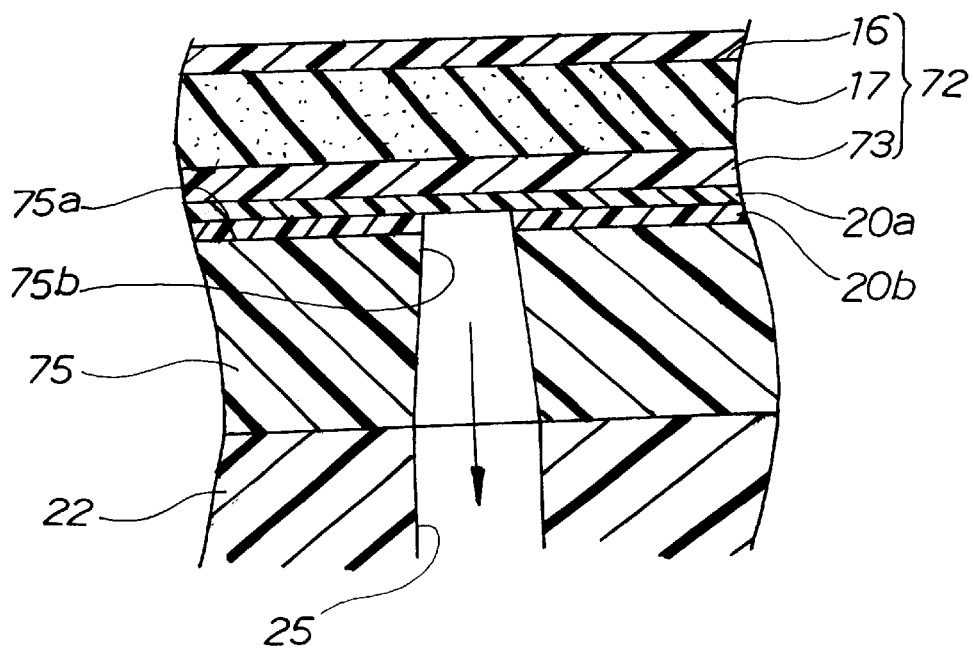
FIG. 28 is an enlarged view of a portion in a circle shown in FIG. 27.

Then, an upper mold member (not shown) is moved downwardly toward the lower mold member 22 to close the vacuum mold assembly with the sheet 72 and the base member 75 held therein. Subsequently, the vacuum source (vacuum pump) 23 is activated and the shut-off valve 24 is open whereupon air is evacuated or exhausted from the vacuum holes 75b of the base member 75 and the vacuum holes 25 in the lower mold member 22. With this evacuation, the sheet 72 is drawn by vacuum or suction down onto the profiled surface 75a of the base member 75 to thereby effect adhesive-bonding therebetween by means of the adhesive 20b, as shown in FIG. 27. During that time, the barrier layer 73 having a greater modulus of elasticity than the facing layer 16 can stand flat as shown in FIG. 28 and does not flex toward the vacuum holes even when subjected to vacuum force tending to concentrate on the vacuum holes 75b. Since the foam layer 17 is separated from the vacuum holes 75b by means of the barrier layer 73, there is no risk of generating a recessed portion in the foam layer 17. The facing layer 16 provided over the foam layer 17 is, therefore, free from depression or recess and hence has an attractive appearance even through it is formed by a soft plastic material such as thermoplastic olefin-based elastomer.

Although the sheet and the profiled surface of the base member in the embodiments described above are bonded together by means of an adhesive and with the agency of a primer, the adhesive and the primer may be omitted when at least one of the sheet and the profiled surface is either made from a material or processed with a treatment that ensures firm bonding between the sheet and the profiled surface without an adhesive. In this instance, heating of the adhesive is not needed.

Additionally, the upper mold member of the vacuum mold assembly may be omitted when vacuum force or suction sufficient to draw the sheet down onto the profiled surface of the base is generated when air is evacuated from the vacuum passages defined between the sheet an the profiled surface while the sheet is placed over the base member set on the lower mold member.

Obviously, various minor changes and modifications of the present invention are possible in the light of the above teaching. It is therefore to be understood that within the scope of the appended claims the invention may be practiced otherwise than as specifically described.

What is claimed is:

1. A method of covering a profiled surface of a base member with a sheet by bonding together the sheet and the base member under vacuum, comprising the steps of:
   (a) providing a base member having provided surface and a sheet of thermoplastic material;
   (b) setting the base member on an outside surface of a mold member of a vacuum mold assembly with the profiled surface facing outward, the mold member having a plurality of vacuum holes opening at one end to the outside surface of the mold member and connected at the other end to a vacuum source;
   (c) providing one of said profiled surface of the base member and one surface of the sheet with a portion forming spaced vacuum passages extending across said profiled surface of the base member and said one surface of the sheet, said spaced vacuum passages being parallel and having a pitch set to vary inversely with elongation of the sheet on the base member;
   (d) while keeping the sheet in a pre-stretched condition, placing the sheet over the base member so that the vacuum passages formed by said portion are provided between said profiled surface of the base member and said one surface of the sheet and held in fluid communication with at least one of the vacuum holes in the vacuum mold member; and
   (e) activating the vacuum source to evacuate air from the vacuum passages though the vacuum hole in the mold member so that the sheet is drawn by vacuum down onto the profiled surface to thereby effect elongation of the sheet and bonding between the sheet and the profiled surface.

2. A method according to claim 1, wherein said sheet has a laminated structure including a facing layer of olefin thermoplastic elastomer, and a cushioning foam layer of polypropylene, and wherein the vacuum grooves have a width ranging from 0.3 mm to 0.9 mm and a depth ranging from 0.3 mm to 2.0 mm.

3. A method of covering a profiled surface of a base member with a sheet by bonding together the sheet and the base member under vacuum, comprising the steps of:
 (a) providing a base member having provided surface and a sheet of thermoplastic material;
 (b) setting the base member on an outside surface of a mold member of a vacuum mold assembly with the profiled surface facing outward, the mold member having a plurality of vacuum holes opening at one end to the outside surface of the mold member and connected at the other end to a vacuum source;
 (c) providing one of said profiled surface of the base member and one surface of the sheet with a portion forming vacuum passages extending across said profiled surface of the base member and said one surface of the sheet, including providing small polypropylene particles having an average diameter ranging from 0.1 mm to 0.3 mm between said profiled surface of the base member and said one surface of the sheet with a predetermined distribution;
 (d) while keeping the sheet in a pre-stretched condition, placing the sheet over the base member so that the vacuum passages formed by said portion are provided between said profiled surface of the base member and said one surface of the sheet and held in fluid communication with at least on of the vacuum holes in the vacuum mold member; and
 (e) activating the vacuum source to evacuate air from the vacuum passages though the vacuum hole in the mold member so that the sheet is drawn by vacuum down onto the profiled surface to thereby effect bonding between the sheet and the profiled surface.

4. A method of covering a profiled surface of a base member with a sheet by bonding together the sheet and the base member under vacuum, comprising the steps of:
 (a) providing a base member having a profiled surface and a sheet of thermoplastic material;
 (b) setting the base member on an outside surface of a mold member of a vacuum mold assembly with the profiled surface facing outward, the mold member having a plurality of vacuum holes opening at one end to the outside surface of the mold member and connected at the other end to a vacuum source;
 (c) providing one of said profiled surface of the base member and one surface of the sheet with a portion forming vacuum passages extending across said profiled surface of the base member and said one surface of the sheet;
 (d) while keeping the sheet in a pre-stretched condition, placing the sheet over the base member so that the vacuum passages formed by said portion are provided between said profiled surface of the base member and said one surface of the sheet and held in fluid communication with at least one of the vacuum holes in the vacuum mold member; and
 (e) activating the vacuum source to evacuate air from the vacuum passages though the vacuum hole in the mold member so that the sheet is drawn by vacuum down onto the profiled surface to thereby effect elongation of the sheet and bonding between the sheet and the profiled surface said sheet including a facing layer, a cushioning foam layer and a barrier layer laminated in the order named, said barrier layer providing said one surface of said sheet and having a greater modulus of elasticity than the facing layer.

5. A method according to claim 4, wherein said facing layer has a modulus of elasticity ranging from 0.02 to 2.0 kg/cm$^2$, and the barrier layer 73 has a modulus of elasticity ranging from 3.0 to 5.0 kg/cm$^2$.

6. A method according to claim 5, wherein said facing layer is made from olefin thermoplastic elastomer, said foam layer is made from polypropylene, and said barrier layer is made from polypropylene.

* * * * *